United States Patent [19]

Sakai et al.

[11] Patent Number: 5,329,122

[45] Date of Patent: Jul. 12, 1994

[54] INFORMATION PROCESSING APPARATUS AND SCANNING TUNNEL MICROSCOPE

[75] Inventors: Kunihiro Sakai, Isehara; Katsunori Hatanaka, Yokohama; Takahiro Oguchi, Ebina; Akihiko Yamano; Shunichi Shido, both of Sagamihara, all of Japan

[73] Assignee: Canon Kabushiki Kaisha, Tokyo, Japan

[21] Appl. No.: 935,399

[22] Filed: Aug. 26, 1992

[30] Foreign Application Priority Data

Aug. 29, 1991 [JP] Japan .................................. 3-242324
Sep. 24, 1991 [JP] Japan .................................. 3-273288
Jun. 30, 1992 [JP] Japan .................................. 4-173331

[51] Int. Cl.⁵ ............................................. H01J 37/26
[52] U.S. Cl. ...................................... 250/306; 369/126
[58] Field of Search ................. 250/306, 307; 369/126; 365/151

[56] References Cited

U.S. PATENT DOCUMENTS

| | | | |
|---|---|---|---|
| 4,952,857 | 8/1990 | West et al. | 250/306 |
| 5,036,196 | 7/1991 | Hosaka et al. | 250/306 |
| 5,107,112 | 4/1992 | Yanagisawa et al. | 250/306 |
| 5,148,026 | 9/1992 | Watanabe et al. | 250/306 |
| 5,150,035 | 9/1992 | Nose et al. | 324/71.1 |
| 5,161,149 | 11/1992 | Potember et al. | 250/306 |
| 5,187,367 | 2/1993 | Miyazaki et al. | 250/306 |

FOREIGN PATENT DOCUMENTS 63-161552 7/1988 Japan .
63-161553 7/1988 Japan .

OTHER PUBLICATIONS

"Scanning Tunneling Microscopy" by G. Binnig et al. Helvetica Physica Acta; vol. 55/No. 6,/1982 pp. 626-781 May 9, 1983 Zurich, Switzerland.

"Silicon as a Mechanical Material" by Kurt E. Petersen, Proceeding of The IEEE, vol. 70, No. 5, May 1982 pp. 427-457.

Primary Examiner—Paul M. Dzierzynski
Assistant Examiner—Kiet T. Nguyen
Attorney, Agent, or Firm—Fitzpatrick, Cella, Harper & Scinto

[57] ABSTRACT

An information processing apparatus for effecting recording of information on and/or reproduction of information from a recording medium is provided with a probe electrode, a cantilever piezo-electric member, a controller and a detector. The probe electrode is relatively displaced to the recording medium by the cantilever piezo-electric member. The controller applies a control signal to the cantilever piezo-electric member to control the cantilever piezo-electric member. The detector detects a minute signal obtained on the tunnel effect caused between the probe electrode and the recording medium. A switch element is further provided on the apparatus so as to electrically disconnect between the cantilever piezo-electric member and the controller during the minute signal being detected by the detector.

8 Claims, 22 Drawing Sheets

(SECTION 3-3')

(SECTION 5-5')

INFORMATION PROCESSING APPARATUS AND SCANNING TUNNEL MICROSCOPE

BACKGROUND OF THE INVENTION

1. Field of the Invention

This invention relates to an information processing apparatus which two-dimensionally scans a medium by a probe and effects recording and reproduction by the physical interaction of the medium and the probe, or to a scanning type tunnel electronic microscope (STM). The invention, more particularly, relates to an STM and a compact and high-density information processing apparatus to which the principle of the STM is applied.

2. Related Background Art

In recent years, there has been developed a scanning type tunnel microscope (hereinafter referred to as STM) which can directly observe the electron structure of the surfaces of substances and the vicinity of the surfaces (G. Binnig et al., *Helvetica Physica Acta.* 55. 726 (1982)), and it has become possible to observe real spatial images at a high resolving power irrespective of single crystal or noncrystal and moreover, this STM has the advantage that measurement can be accomplished with low electric power substantially without imparting damage by electric current to sample substances, and further it operates not only in super-light vacuum but also in the atmosphere and in solution and can be applied to various materials. Therefore, its wide application is expected.

The STM utilizes the phenomenon that when a voltage is applied to between a metallic probe and an electrically conductive sample and the probe is brought to a distance of about 1 nm with respect to the sample, a tunnel current is created. Recently, as disclosed, for example, in Japanese Laid-Open Patent Applications Nos. 63-161552 and 63-161553, there have been made numerous proposals to utilize the principle of this STM to construct an information processing apparatus directed chiefly to high-density recording and reproduction. That is, it is said that if use is made of a method of imparting physical deformation onto a recording medium corresponding to a sample by a probe electrode corresponding to the probe of the STM, or varying the electron state of the surface of the medium to thereby record information, and reproducing the information of a recording bit by a tunnel current flowing between the probe electrode and the recording medium, large-scale information can be recorded and reproduced at high density of the molecular or atomic order.

It has recently been reported that in the above-described recording method, to impart physical deformation onto the recording medium, a hole can be formed not only by urging a pointed recording probe against the recording medium to thereby dent the latter, but also by applying a pulse voltage onto a recording medium such as graphite. That is, the probe electrode is brought close to the surface of the recording medium, and then applying a voltage of 3-8 V with a pulse width of 1-100 $\mu$s to between the two, a hole having a diameter of the order of 40 angstroms can be formed, and such a hole is readily usable as a recording bit. On the other hand, to vary the electron state to thereby effect recording, there is known a method of applying a voltage to between a recording medium and a ground electrode and a probe electrode to thereby vary the electrical resistance characteristic of a minute portion, and attention has been paid to this method because of the ease of erasing and rewriting.

As the recording medium, use is made of a thin film layer of a material such as a chalcogenide or an organic compound of the $\pi$ electron family which exhibits a switching characteristic having a memory property in a voltage-current characteristic, for example, a cumulative film of an appropriate organic substance made on a ground electrode by Langmuir-Blodgett's technique (hereinafter referred to as LB technique).

The probe electrode is usually, for example, a needle tip of tungsten, Pt-Ir, Pt or the like mechanically polished and thereafter polished by an electric field and attached to a piezo-electric element, and displacement-controlled by an applied voltage. As a method of making a flexible portion for moving the probe electrode, there is, for example, a working technique making a minute structure on a substrate (K. E. Peterson, "Silicon as Mechanical Material", *Proceedings of the IEEE,* 70, Vol. 420 p, 1982) by using a semiconductor processing technique. Thereby, it has become possible to form a hole portion 30 in a single crystal silicon substrate 21 shown, for example, in FIG. 9 of the accompanying drawings, to provide a tongue-like finely moving mechanism 2 on the silicon substrate 21 by cantilever support, and mount a probe electrode 1 on the front end thereof.

The tongue-like portion 2 is comprised of a layer-like piezo-electric element and electrodes, and by applying voltage between the electrodes, the probe electrode is varied in a direction perpendicular to the plane of the single crystal silicon substrate 21 (the direction of the Z axis). As regards displacement in XY direction, relative movement is effected by the silicon substrate or a medium opposed thereto being installed on a stage capable of scanning. Of course, at this time, there can be realized a memory device provided with a converter array having a number of tongue-like portions 2 arranged thereon. Besides the tongue-like portion 2 of such cantilever structure, a tongue-like portion of a bridge-like twin beam structure is also known.

It is very important in achieving the compactness, the great capacity and the high speed of an information processing apparatus to form a probe having a finely moving mechanism by minute working. On the other hand, however, it results in crosstalk and deterioration of S/N ratio because a signal system for driving and a signal system for recording and reproduction come very close to each other.

SUMMARY OF THE INVENTION

It is the object of the present invention to provide an information processing apparatus and a scanning type tunnel electronic microscope using a probe which decreases or eliminates the coupling between a driving system signal and a recording or reproducing signal and enables precise displacement control and improved reproducibility and stability of recording and reproduction to be achieved.

The above object is achieved by providing, in an information processing apparatus for effecting the recording and/or reproduction of information on a recording medium by the use of a probe electrode, a probe electrode, means for displacing said probe electrode relative to said medium, means for applying a control signal to said displacing means to thereby control said displacing means, means for detecting a minute signal obtained from a physical phenomenon occurring between said probe electrode and said medium, and means for cutting off the electrical connection between said displacing means and said control means as long as the minute signal is detected by said detecting means.

Also, the above object is achieved by providing, in a scanning type tunnel electronic microscope for observing the surface of a sample therethrough by the use of a tunnel current created between a probe electrode and the surface of said sample, a probe electrode, means for displacing said probe electrode relative to the surface of said sample, means for applying a control signal to said displacing means to thereby control said displacing means, means for detecting a tunnel current created between said probe electrode and the surface of said sample, and means for cutting off the electrical connection between said displacing means and said control means as long as the tunnel current is detected by said detecting means.

According to such a construction, the electrical connection between the displacing means (finely moving mechanism) for displacing the probe electrode and the control means for controlling said displacing means is cut off during a period for which signal application or signal detection is effected through the probe electrode and therefore, a signal system (driving signal system) for controlling the probe electrode becomes electrically isolated from a signal system (recording/reproducing signal system) for detecting a minute signal from the probe electrode.

As a result, the crosstalk and coupling from a driving signal to a recording/reproducing signal is remarkably descreased or eliminated.

In the above-described construction, it is preferable that as the displacing means, use be made of a cantilever type actuator utilizing the reverse piezo-electric effect of a piezo-electric member, and it is also preferable to construct the above-described probe as a multiprobe comprising a plurality of probes arranged.

DESCRIPTION OF THE PREFERRED EMBODIMENTS

Figure 1:
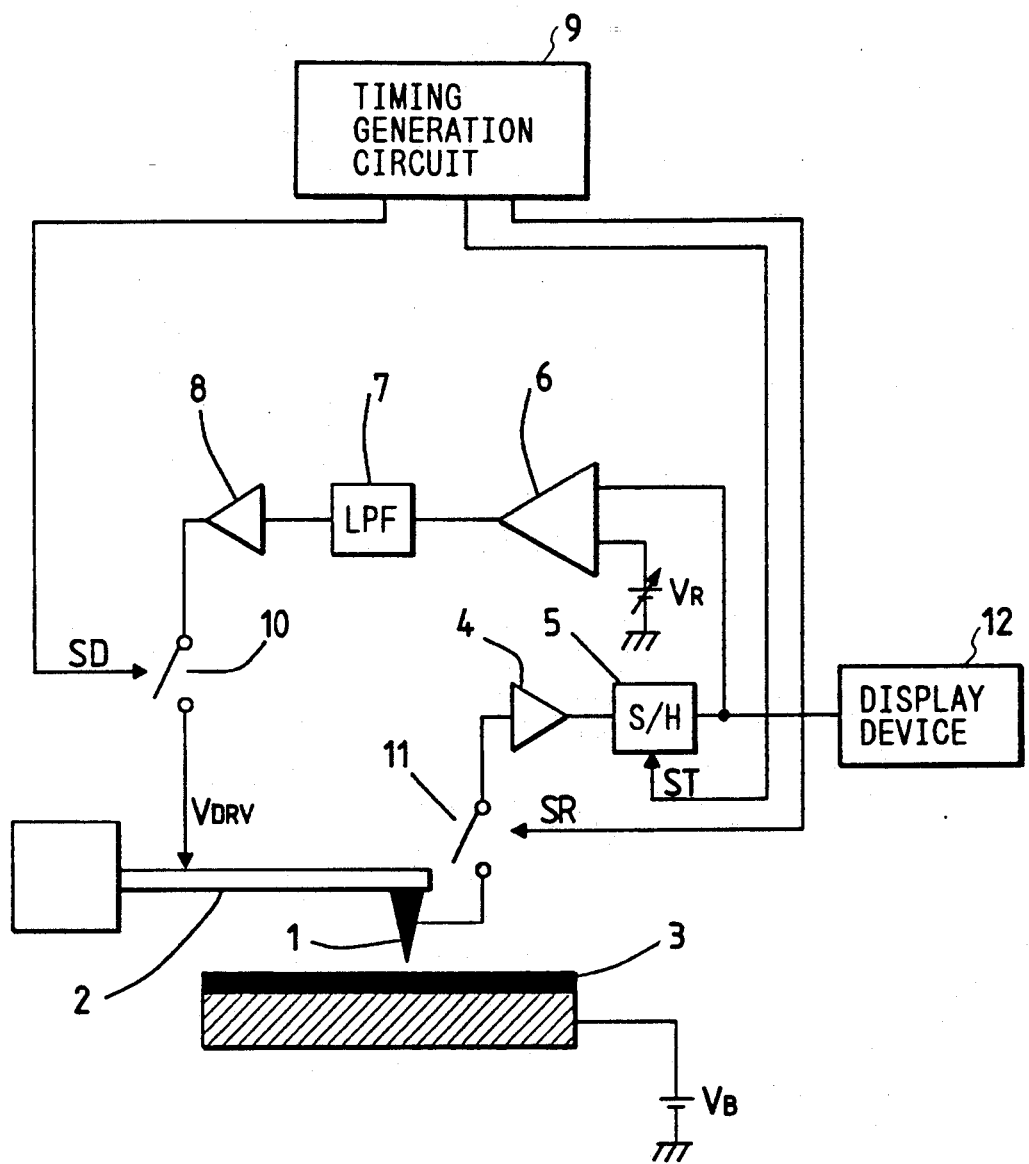
FIG. 1 is a block diagram showing a first embodiment of the information processing apparatus of the present invention.

FIG. 1 is a block diagram showing an information processing apparatus according to a first embodiment of the present invention. In FIG. 1, the reference numeral 3 designates a recording medium to which is proximate and opposed a probe electrode 1 provided on a cantilever type finely moving mechanism 2. The finely moving mechanism 2 is formed by a laminated type piezo-electric element (a cantilever type actuator) and is finely displaceable in the Z direction.

Rough movement in the Z direction is provided on a support for the finely moving mechanism 2 (not shown), whereby the distance between the probe 1 and the medium 3 can be greatly varied. Displacement and scanning in XY direction parallel to the surface of the medium are effected by a scanning mechanism (not shown) provided on a support for the medium. In such an apparatus, servo control is effected in which a tunnel current signal detected by the probe is amplified by a current amplifier 4 while XY scanning is effected, and the amplified tunnel current signal is compared with a reference value by an error amplifier 6 and the finely moving mechanism 2 is driven by a driver 8 so that the tunnel current may become constant. The reference numeral 12 denotes a display device for effecting the display or the like of reproduced information. A low-pass filter 7 is adopted for the purposes of eliminating noise and improving the stability of a control system. The reference numeral 10 designates a switch provided on the output side of a driver for the driving system of the finely moving mechanism, the reference numeral 11 denotes a switch for turning on and off a probe signal, and the reference numeral 5 designates a sample hold circuit for holding such signal. These are controlled by a timing generation circuit 9.

Figure 2A:
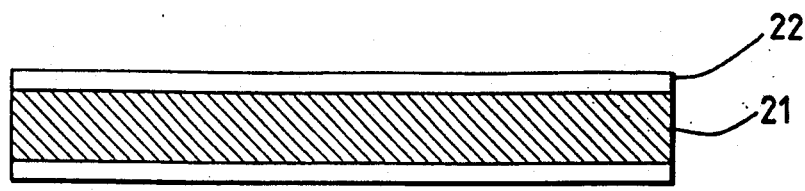
FIGS. 2A-2F are cross-sectional views showing the procedure of formation of a bimorph-driven cantilever type piezo-electric element.
Figure 2B:
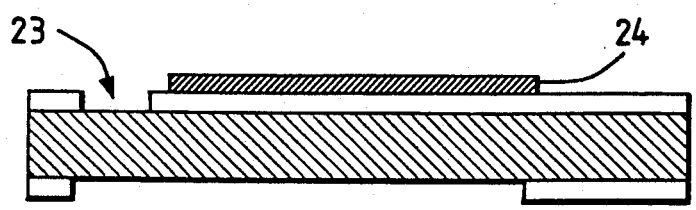
Figure 2C:
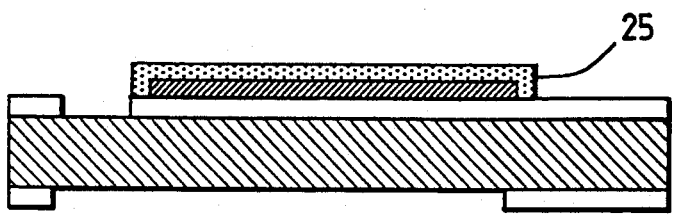
Figure 2D:
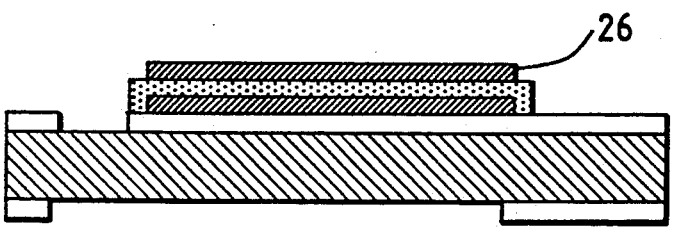
Figure 2E:
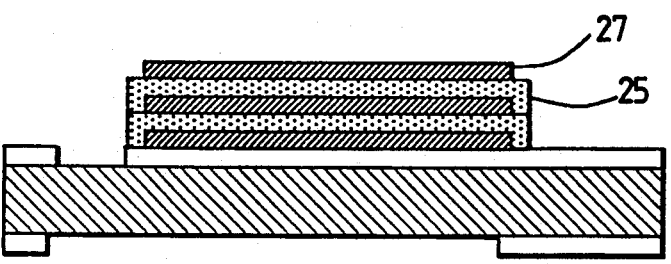
Figure 2F:
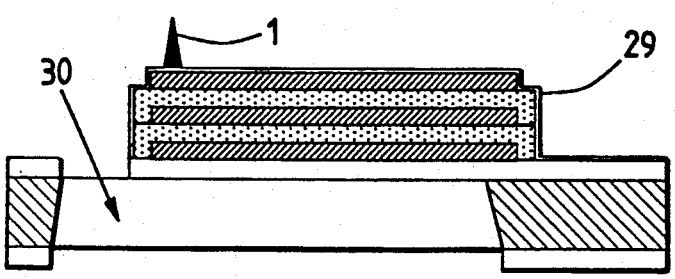

The procedure of formation of the finely moving mechanism by the aforementioned piezo-electric element will hereinafter be described with reference to FIG. 2. Silicon nitride film 22 having a film thickness of 500 nm was first formed as insulating film on the surface of a silicon semiconductor substrate 21 by high frequency sputtering (FIG. 2A). An opening portion 23 (having a width of 1 μm) was then provided in the nitride film via a photolithographic process, whereafter a piezo-electric member bimorph comprising a laminated structure of metallic electrodes and piezo-electric members was formed on the nitride film (FIGS. 2B–2E). As the material of the electrodes, use was made of Au with a ground electrode 24 undercoated with Cr, and Al was used for an intermediate electrode 26 and an upper electrode 27. ZnO (having a film thickness of 1.2 μm) applied by high frequency sputtering was used for a piezo-electric material layer 25. Further, the entire bimorph element made in the above-described manner was covered with a protective layer 29 consisting of silicon nitride film applied by the sputtering method, whereafter the probe 1 having a conical projection produced by vapor deposition Au was formed. Further, anisotropic etching with KOH water solution as the etchant was effected from the lower portion of the substrate, and a clearance portion was provide in an opening portion 30, whereby there was provided a probe unit having a cross-section as schematically shown in FIG. 2F.

Figure 3A:
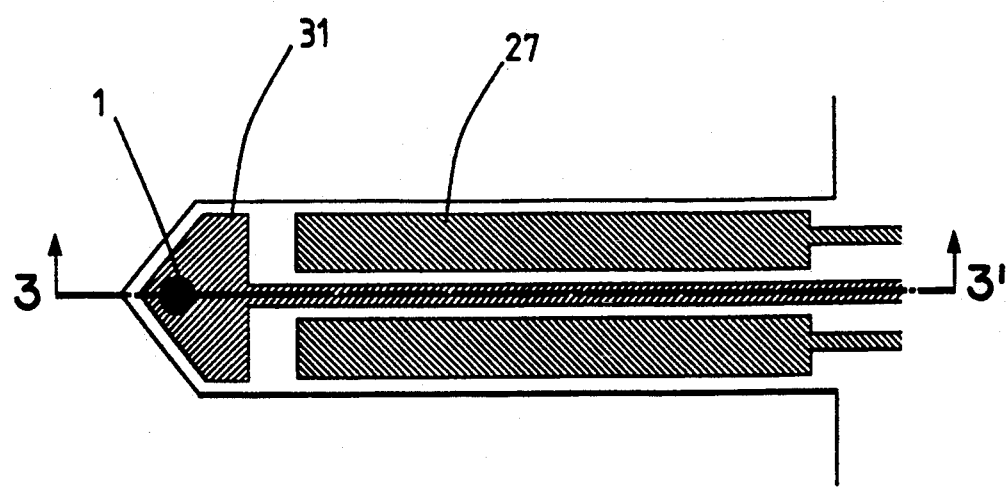
FIGS. 3A and 3B schematic views (plan view and sectional view) showing the configuration of a cantilever.
Figure 3B:
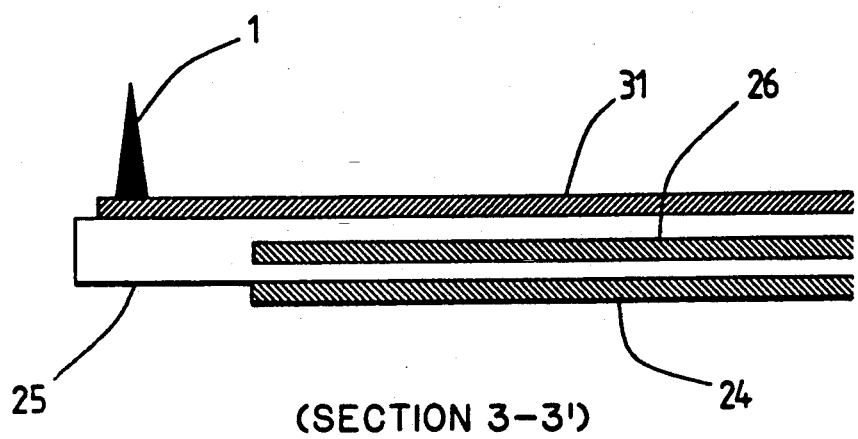

In such a cantilever, the piezo-electric element of bimorph structure is flexed by the difference between a voltage applied between the electrodes 26 and 27 and a voltage applied between the electrodes 26 and 24, and the probe is displaced in Z direction. A wiring electrode 31 for the probe, as shown in FIGS. 3A and 3B is formed on the same surface as the upper electrode 27.

The wiring electrode 31 is disposed with a spacing of the order of several μm to 10 μm with respect to the upper electrode 27, and this poses problems of the coupling capacity and leak resistance between the electrodes. The also exist the coupling capacity and leak resistance between the wiring electrode 31 and the intermediate electrode 26, and if actually, the conventional displacement control in Z direction is effected by the use of the above-described cantilever, driving signals will be superposed one upon another by a tunnel current detected through the probe and it will be difficult to stably effect precise control with the feedback gain heightened.

In the present invention, however, the electrical connection between the driver 8 and the cantilever which is a finely moving mechanism is cut off during the period a signal is detected by the probe and therefore, the inflow and outflow of electric current between the electrodes 31 and 27 in the cantilever and between the electrodes 31 and 26 are deterred and crosstalk is improved. On the other hand, the voltage applied to the cantilever is held for a predetermined time by capacitors formed between the electrodes 31 and 26 and between the electrodes 26 and 24. That is, the displacement of the cantilever will be kept if the period the electrical connection is cut off is shorter than the discharging time of the capacitors.

Figure 4:
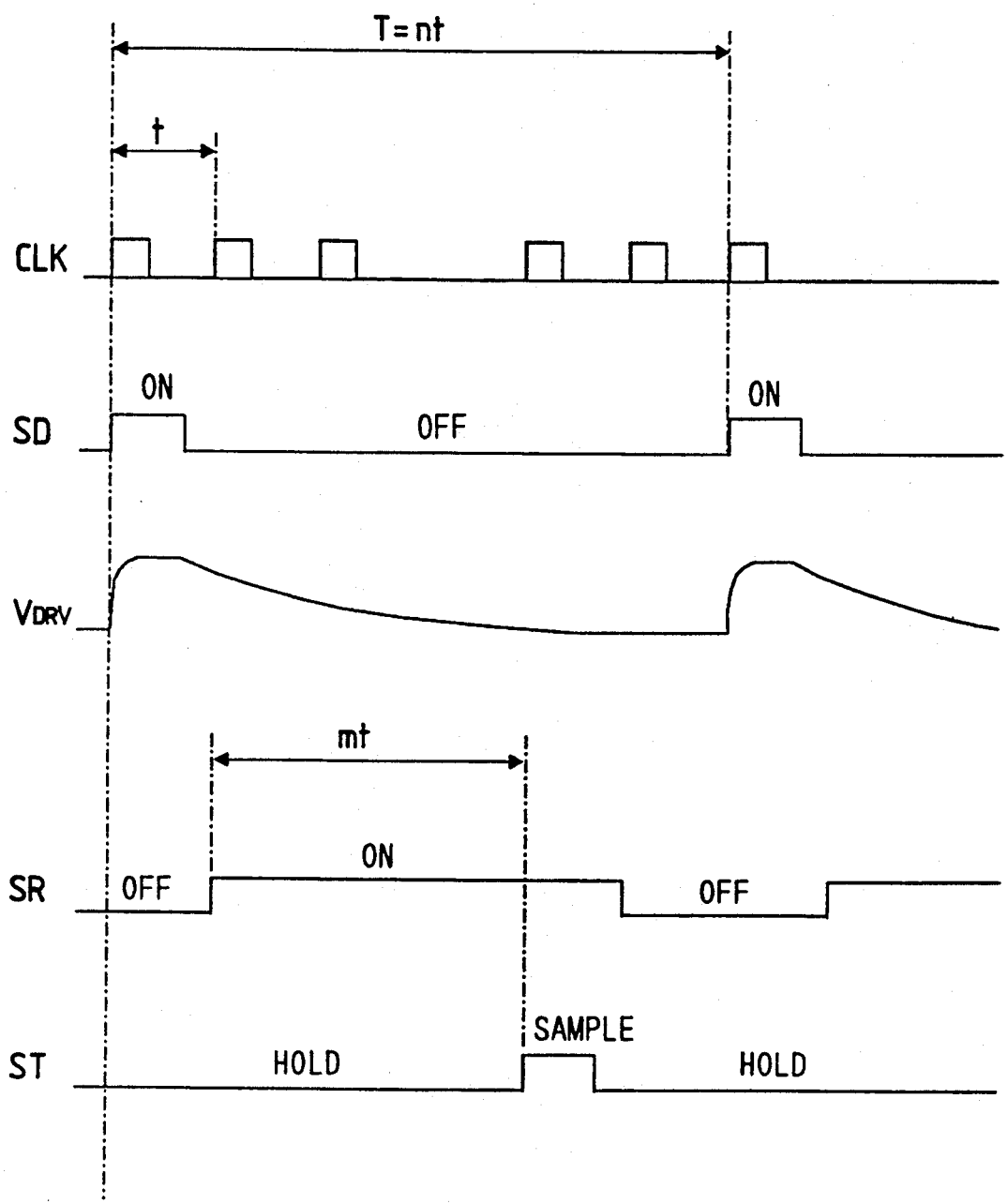
FIG. 4 is a timing chart of voltages applied to respective switch elements and piezo-electric members in the apparatus shown in FIG. 1.

In order to describe the present invention in greater detail, an example of the timing of each specific signal is shown in FIG. 4. In this figure, SD and SR show the ON and OFF states of a switch 10 and a probe signal system switch 11, respectively, inserted in a cantilever driving system (Hi corresponds to ON, and Lo corresponds to OFF). Such signals are synchronized with a clock signal CLK in the timing generation circuit 9.

When SD is ON, the driving system is connected to the cantilever and a voltage Vdrv applied to the piezo-electric member reaches a desired driving voltage. At this time, SR may be ON, but when the coupling from the probe signal system to the driving system or an erroneous operation such as the saturation of the current amplifier 4 by the driving system signal is considered, it is preferable that SR be OFF.

When SD then becomes OFF, the voltage Vdrv is gradually discharged, but after n clocks (period T), it is again charged and reaches a desired voltage. After m clocks after SD turns OFF, a sample signal ST is applied to the sample hold circuit 5 in a state in which SR has become ON, and a probe signal is detected. At this time, SD is OFF and therefore a good signal free of crosstalk is obtained. ST also is repeated at the period T. Accordingly, the servo control system shown in FIG. 1 becomes a discrete value system, but this will pose no problem if the sampling interval T is sufficiently shorter than the signal band, and it is easy to make such control system into digital control using a computer or the like.

Figure 5A:
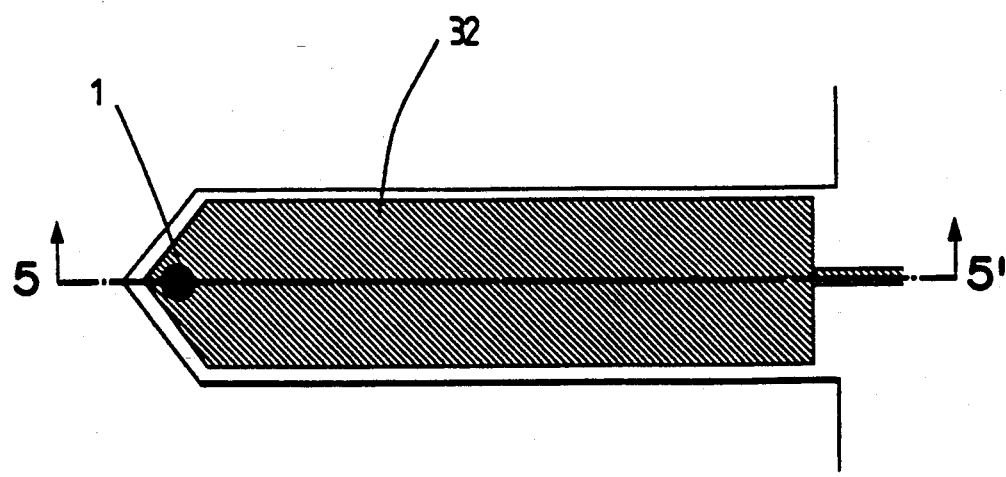
FIGS. 5A and 5B schematic views showing the configuration of another cantilever.
Figure 5B:
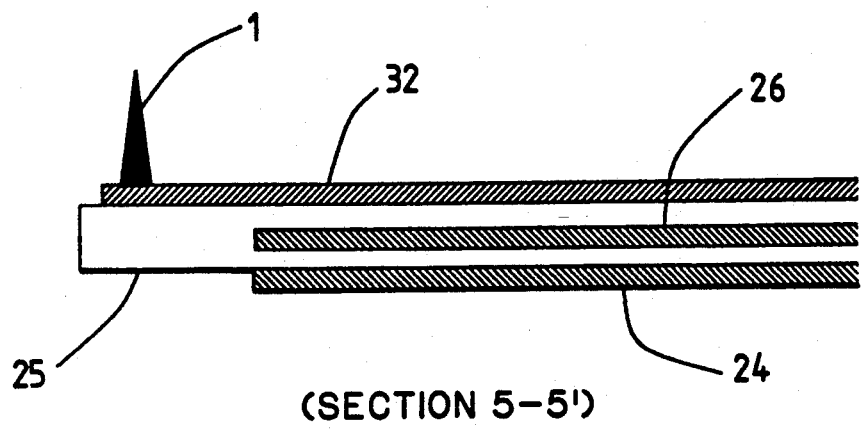

FIGS. 5A and 5B show a top plan view of a finely moving mechanism and a cross-section 5–5' comprising another cantilever type piezo-electric element. In this construction, use is made of a common electrode 32 comprising the aforementioned probe wiring electrode 31 and the electrode 27 on the cantilever made integral with each other.

Figure 6:
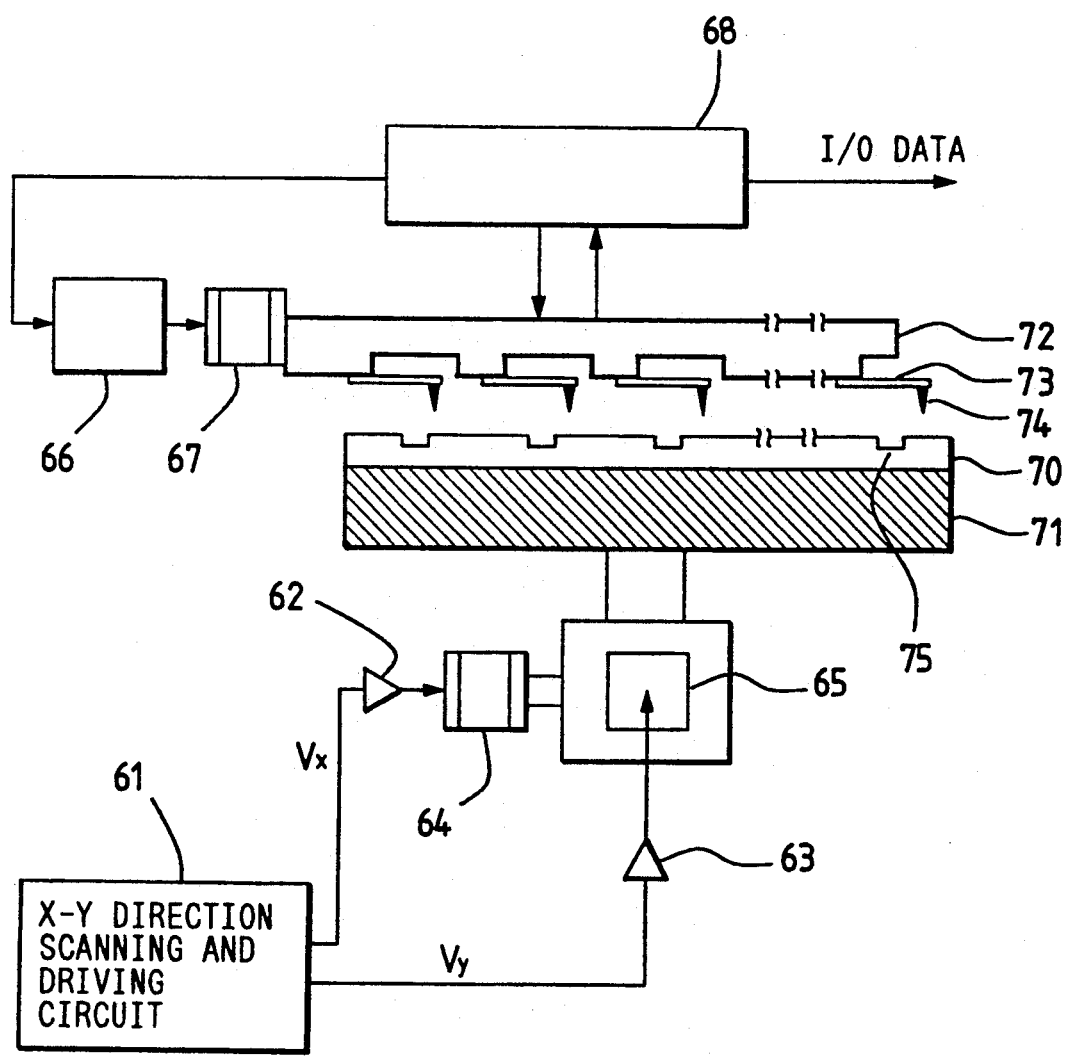
FIG. 6 is a block diagram showing a second embodiment of the information processing apparatus of the present invention.

FIG. 6 shows an information processing apparatus according to a second embodiment of the present invention in which a plurality of cantilevers and probes are disposed. The reference numeral 61 designates an XY direction scanning and driving circuit, the reference numeral 70 denotes a recording medium, the reference numeral 75 designates a tracking pattern on the recording medium (a pattern differing in concave grooves or the surface electron state), the reference numeral 71 denotes a base for a stage and the medium, the reference numeral 72 designates a multiprobe head, the reference numeral 73 denotes cantilevers, the reference numeral 74 designates probe electrodes, the reference numerals 62 and 64 denote a driver and a piezo actuator, respectively, for driving the stage in X direction, and the reference numerals 63 and 65 designate a driver and a piezo actuator, respectively, for driving the stage in Y direction. The reference numeral 67 denotes a piezo actuator for driving the multiprobe head in X direction, and the reference numeral 68 designates a control circuit unit in which is contained a plurality of control circuits provided for respective probes so as to effect data inputting and outputting for each probe and drive control in the direction of Z axis in parallel.

The reference numeral 66 denotes a tracking control circuit unit for detecting the position signal of the tracking pattern from the comparison between a tunnel current signal from the control circuit unit 68 and a tracking edge detection level and measuring the tracking deviation, and driving the actuator 67 to correct it.

The control of each cantilever in the present embodiment is effected in the same way as in the first embodiment. The pursuit of the tracking pattern is effected by the actuator 67 mounted on the multiprobe head.

As the recording medium 70, use is made of a medium comprising a material having a memory effect for the switching characteristic of voltage and current and formed on a substrate 71. In the present embodiment, a substrate 71 having gold epitaxially grown on a flat substrate of glass, mica or the like was prepared, and on this substrate, a cumulative film comprising two layers of monomolecular film was formed by Langmuir-Blodgett's technique (LB technique) by the use of squalium-bisn-6-octyl azulene as a material having a memory effect for the switching characteristic of voltage and current.

Figure 7:
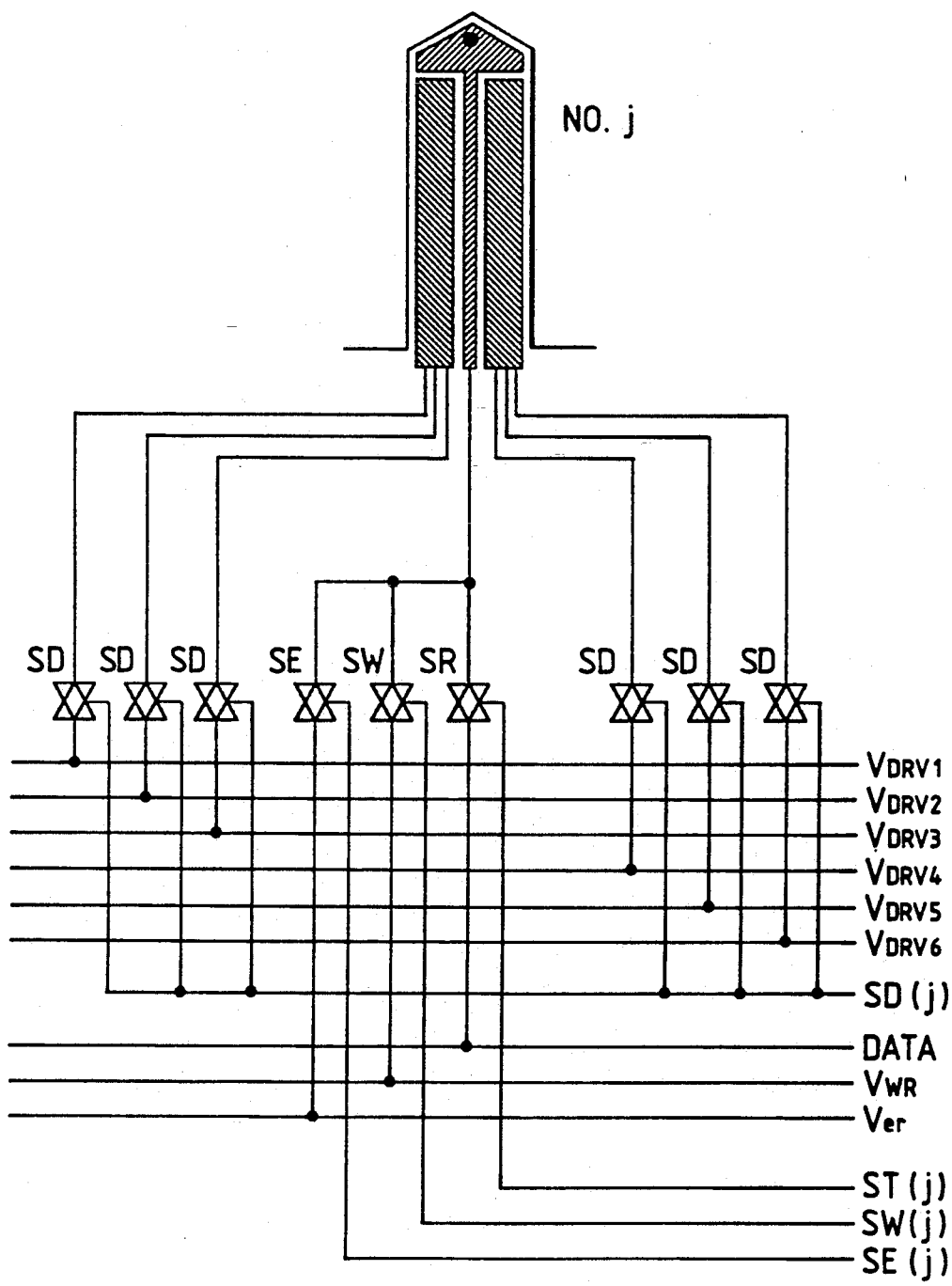
FIG. 7 is a circuit diagram showing the jth cantilever, connected signals and switch elements in the apparatus shown in FIG. 6.

Switch elements are inserted in signal lines connected to the respective probes and cantilevers, as in the first embodiment. A specific example of the circuit is shown in FIG. 7.

SD and SR, as in the first embodiment, designate switch elements in a cantilever driving system and a probe signal reading system, respectively. A probe signal detected, as in the first embodiment, is connected to an error amplifying circuit through a sample hold element ST (not shown) provided in the Z axis control circuit 68. SW and SE denote switch elements connected to a recording pulse applying circuit and an erasing pulse applying circuit, respectively. Each switch has its ON and OFF controlled at the timing shown in FIG. 8. Each switch element is an MOS type switch made on a silicon wafer by the conventional semiconductor technique, and the cantilever was formed on this silicon substrate by the use of the same process as in the first embodiment.

Figure 8:
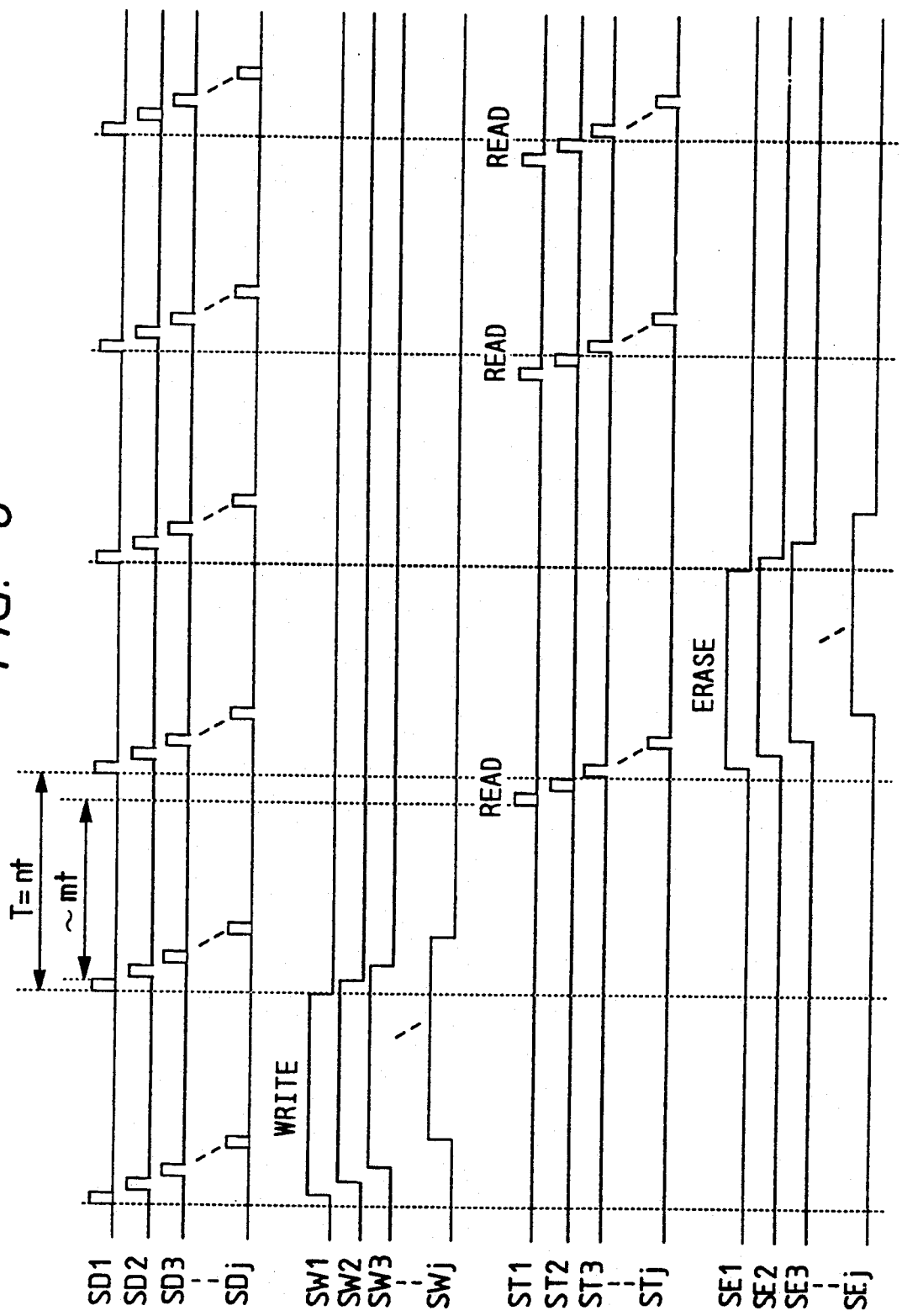
FIG. 8 is a driving timing chart of the switch elements in the apparatus shown in FIG. 6.
Figure 9:
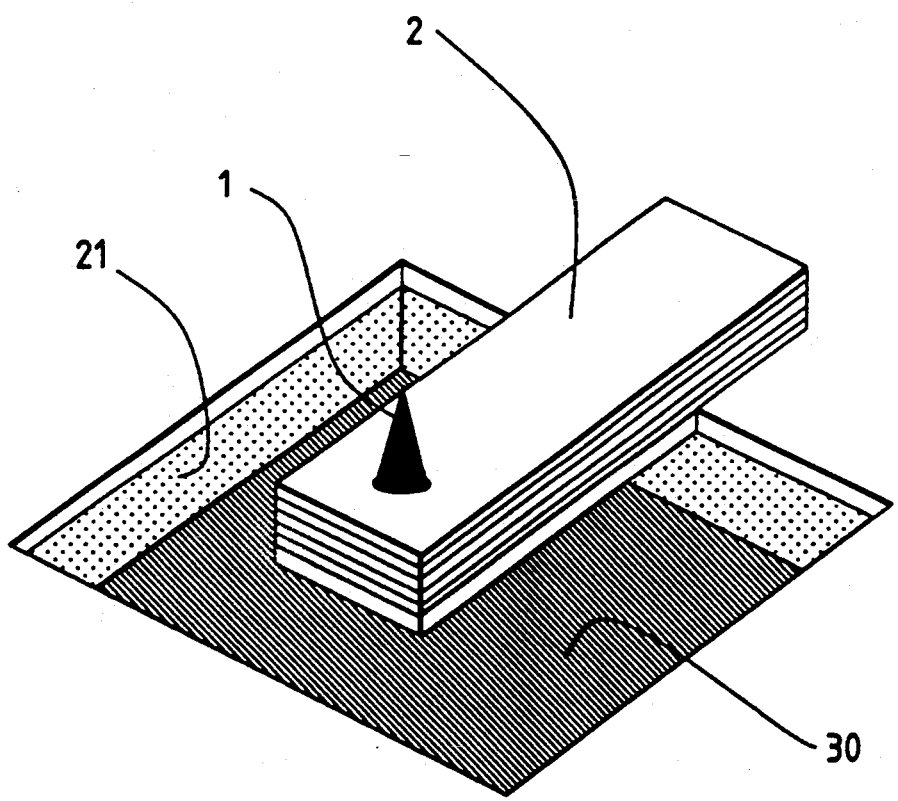
FIG. 9 is a schematic view showing a cantilever type finely moving mechanism and a probe electrode provided thereon.

The experiment of recording/reproduction/erasing using such an apparatus was carried out in the following manner. Each probe is stopped at a position in which the probe current becomes 1nA under a condition of bias voltage 100 mV by the use of the probe signal detection and Z axis control circuit 68. At this time, SD, SR and ST effect control at the same timing as in the first embodiment. Subsequently, the recording medium 70 is caused to scan in XY direction relative to the probe 74 by the XY scanning circuit 61. At this time, the probe is held at a predetermined distance relative to the surface of the recording medium by 305. In this state, SW is closed instead of SR being closed (recording). SW is specifically connected to a bias voltage source of +6 V, and as long as SW is ON, a pulse of a crest value +6 V is applied to between the probe and the recording medium. XY scanning is awaited and at a point of time whereat the probe has been returned to the location at which the application of the pulse has been effected, the detected probe current has momentarily increased to about 0.1 $\mu$A. It is read that the detected current at the recording position has increased two-fold (reproduction). Further, when XY scanning is again effected and the probe arrives at the recording bit position, SE is closed instead of SR, whereby a pulse of a crest value −4 V is applied (erased) to the recording medium, whereupon the probe current detected thereafter at such position restores 1nA. The above-described recording/reproduction/erasing can be repeated stably. Also, as shown in FIG. 8, similar experiments can be independently carried out for a plurality of probes, and it will be seen that this invention is useful also in an information processing apparatus using multiple probes.

Description will now be made of the circuit construction (the recording/reproducing signal system) of a multiprobe head suitable for use in the information processing apparatus of the above-described second embodiment.

The application of the circuit construction hereinafter described can make the apparatus compact.

Description will hereinafter be made with reference to FIGS. 10 to 18.

Figure 10:
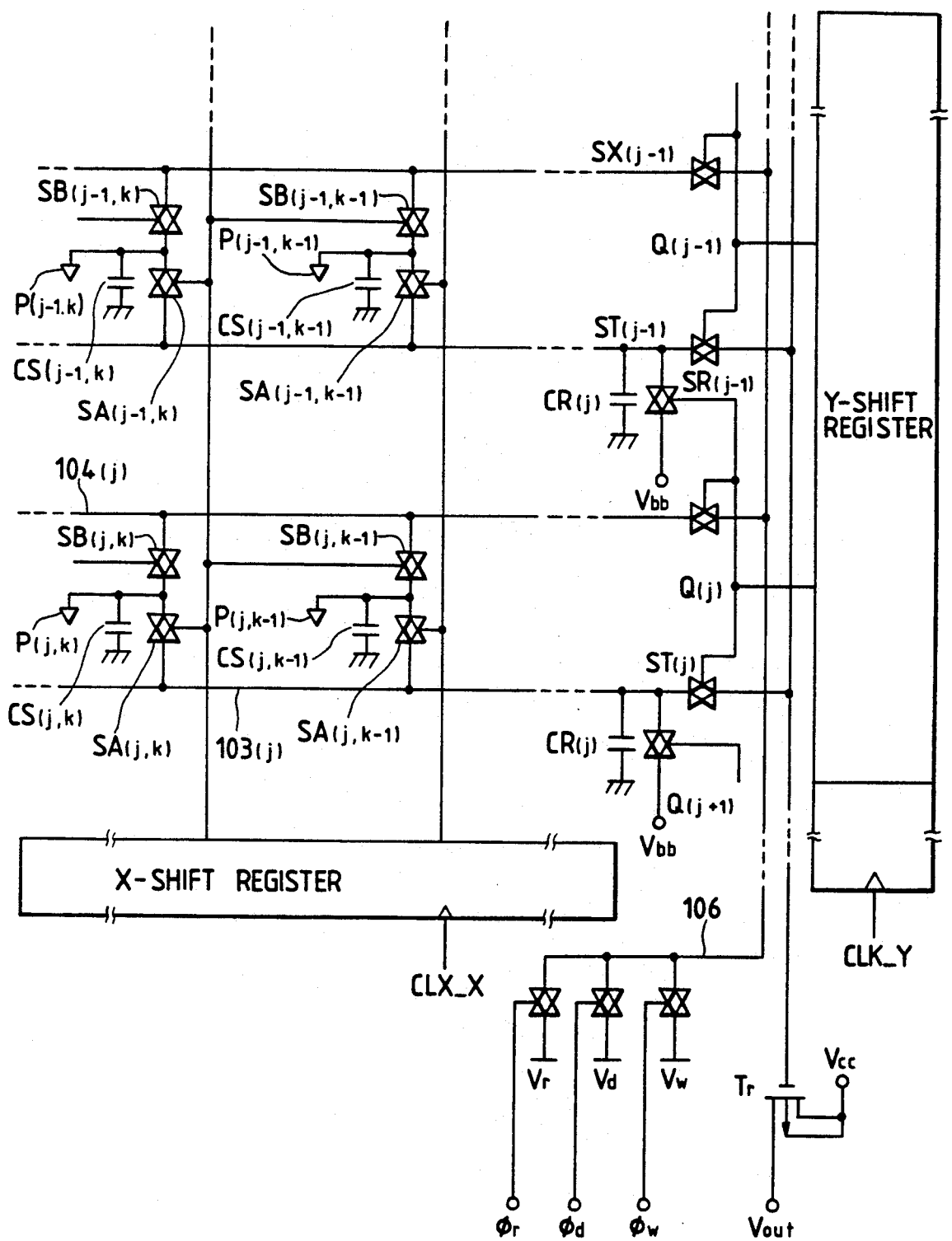
FIG. 10 is a circuit diagram of a multiprobe head suitable for use in the information processing apparatus of the present invention.
Figure 11:
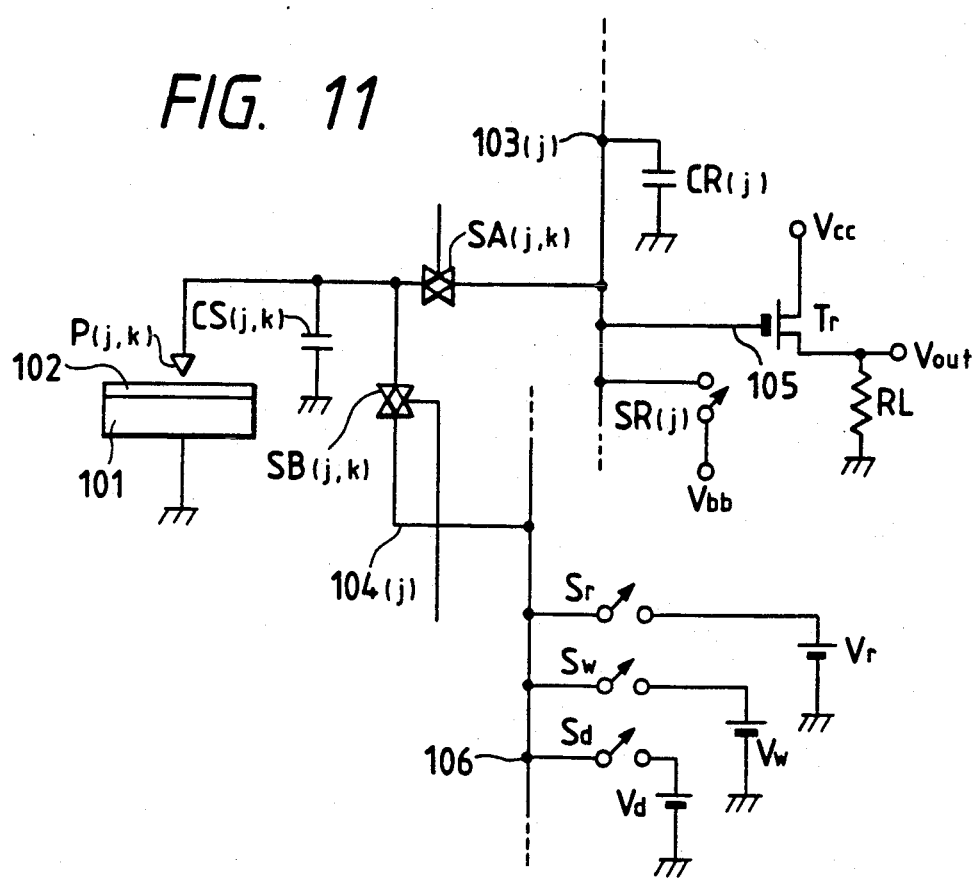
FIG. 11 is a diagram of an equivalent circuit around the probes in the j column and k row of the probe array portion shown in FIG. 10.

FIG. 10 is a circuit diagram of a multiprobe head which is the converter of the information processing apparatus, and FIG. 11 shows an equivalent circuit near the probes in the j column and k row thereof. A recording layer 102 is formed on the surface of the substrate 101 of a recording medium, and a probe electrode P(j, k) opposed thereto has connected thereto electrostatic capacitance CS(j, k) for charge accumulation and an analog switch SA(j, k) for transferring charges of the electrostatic capacitance CS (j , k) to the capacitance CR (j) of a signal reading line 103(j). SR(j) designates a switch for resetting the capacitance CR(j) of the signal reading line 103(j) to a potential Vbb, and there is provided a field effect transistor Tr for reading out the potential of the capacitance CR(j) as a voltage output, and it transmits information to a load resistance RL. A switch SB(j, k) is an analog switch for charging the electrostatic capacitance CS(j, k), and the electrostatic capacitance CS(j, k) is connected to potentials of reading-out bias Vr, writing-in bias Vw and erasing bias Vd via a voltage supply line 104(j) and switches Sr, Sw and Sd. It should be noted that (j, k) represents a matrix symbol of (j=1, 2, ..., n, k=1, 2, ..., m), and j represents a matrix symbol of (j=1, 2, ..., n) .

The reading-ouf of data by this circuit construction is accomplished by reading out a potential variation in the electrostatic capacitance CS(j, k) caused by the charges stored in the electrostatic capacitance CS(j, k) flowing into the recording medium layer 102 via the probe electrode P(j, k).

Figure 12:
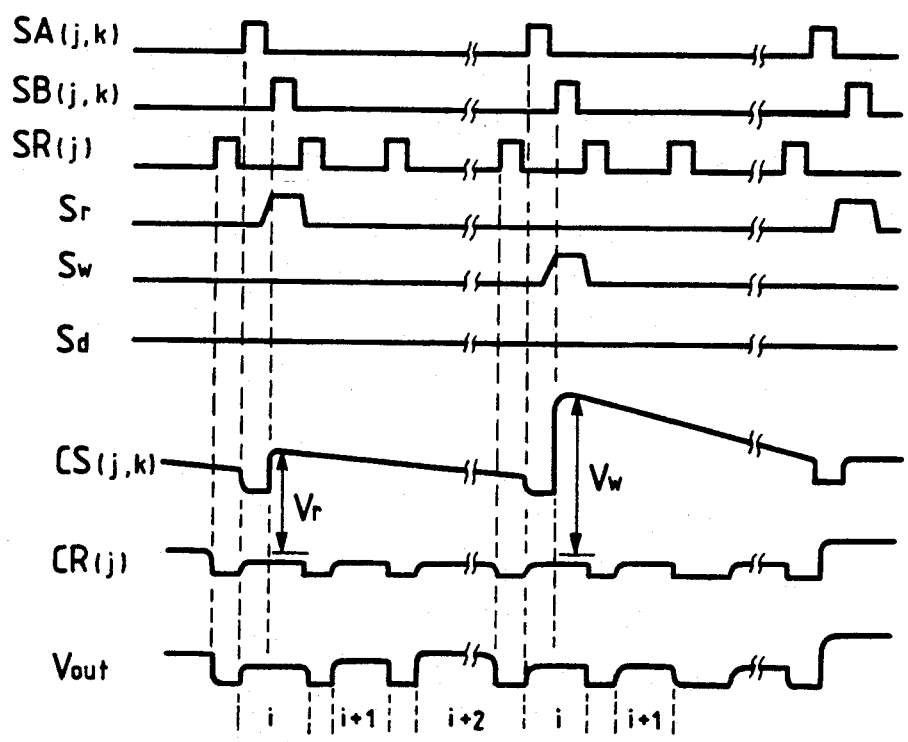
FIG. 12 is a timing chart illustrating the operation of the circuit shown in FIG. 11.

The procedure of this operation will hereinafter be described with reference to the timing chart of FIG. 12. The switch Sr is first put in its ON state, and the bias voltage source Vr is connected to the voltage supply line 104(j). At this time, the analog switch SB(j, k) is rendered into its ON state, the electrostatic capacitance CS(j, k) is charged to a potential Vr, and the analog switch SB(j, k) is again placed in its OFF state. At this time, the probe electrode P(j, k) is placed at a predetermined location on the recording medium layer 102 from which data is to be read out. The charges of electrostatic capacitance CS(j, k) flow into the recording medium layer 102 via the probe electrode P (j, k) and the magnitude of the current flowing in at this time is determined by the recording state of the recording medium layer 102.

After the lapse of a predetermined time, the switch SR(j) is turned ON, the signal reading line 103(j) is reset to the potential Vbb, the switch SR(j) is now turned OFF and the analog switch SA(j, k) is turned ON to thereby transfer the charges of electrostatic capacitance CS(j, k) to the capacitance CR(j ) of the signal reading line 103 (j) . The potential of the capacitance CR(j) at this time is read out by the transistor Tr.

The above-described operation is repetitively performed with respect to the respective probe electrodes P(j, k) in succession, whereby any variation in the tunnel current attributable to the uneven modulation or a change in the electron state in the recording medium layer 102 can be read out as a potential variation in the electrostatic capacitance CS(j, k). The reset potential Vbb is a bias voltage for keeping the field effect transistor Tr active.

The writing operation will now be described. The switch Sw is put into its ON state, and the potential Vw of the bias voltage source is connected to the voltage supply line 104(j). The probe electrode P(j, k) is placed at a predetermined writing position on the recording medium layer 102, the analog switch SB(j, k) is rendered ON and the electrostatic capacitance CS(j, k) is charged to a potential Vw, whereafter the analog switch SB(j, k) is again put into its OFF state.

Where the recording medium layer 102 is a $\pi$ electron family compound which is modulated by a voltage exceeding a certain threshold voltage, the voltage exceeding the threshold value is set to the potential Vw, and where the recording medium layer 102 is a medium using the partial melting and evaporation of the surface of metallic thin film, the potential Vw given by the following expression is used by energy E necessary for the formation of the bit thereof.

$$Vw \geq \{2E/CS(j, k)\}^{\frac{1}{2}}$$

By this voltage potential Vw, a writing-in bit is formed in the recording medium layer 102 and simultaneously with the writing-in, the charges of the electrostatic capacitance CS(j, k) are discharged.

The erasing operation is performed similarly to the aforedescribed writing-in operation, but the bias voltage source connected to the voltage supply line 104(j) is set to a potential Vd instead of the potential Vw, and the electrostatic capacitance CS(j, k) is charged with a voltage necessary for the erasing of the recording bit.

In the reading-out operation according to the present invention, a variation in the voltage caused by the discharging or charging of the charges of the electrostatic capacitance is used to detect the tunnel current and therefore, the circuit is of a low current and a high impedance and yet is not liable to be affected by heat noise and thus, signal reading-out which is high in S/N ratio and small in the irregularity between bits can be accomplished. Also, in the writing-in and erasing operations, the amount of poured-in charge and the amount of energy necessary for the writing into or the erasing of the recording medium can be prescribed by the value of the electrostatic capacity CS(j, k) and the charging voltage and therefore, even when the tunnel gap between the probe and the recording layer varies, writing-in and erasing can be effected stably and with good reproducibility without the flow of any abnormal current.

The plurality of probe electrodes P(j, k), as shown in FIG. 10, are connected together in the form of a matrix of m and n by an X-shift resistor and a Y-shift resistor. The output lines C(k) of the X-shift resistor are connected to the gate electrodes of signal transferring analog switches SA(j, k) and SB(j k−1) provided on the respective probe electrodes P(j, k). Also, the output line Q(j) of the Y-shift resistor is connected to the gate electrodes of an analog switch ST(j) connected to a signal reading-out line 103(j), like an analog switch SX(j) connected to the voltage supply line 104(j) of the corresponding column, and to the gate electrode of a resetting analog switch SR(j−1) connected to a signal reading-out line 103(j−1) corresponding to a column short of said column by one.

One output C(k) of the X-shift resistor is selected, the signal transferring analog switch SA(j, k) in the corresponding row becomes ON, and the charges of the electrostatic capacitance CS(j, k) are transferred to signal reading-out lines 103P(j) in the respective columns. When this row is selected, a charging analog switch SB(j, k−1) in the row short of said row by one also becomes ON, and the electrostatic capacitance CS(j, k−1) is charged from the voltage supply line 104(j) in each column.

Signal charges transferred from the signal reading-out line 103(j) in each column to the capacitance CR(j) are multiplexed by the analog switch ST(j) which is driven by the Y-shift resistor, whereafter they are output to a signal line 105 and are impedance-converted by the transistor Tr, and then are output from Vout. At this time, the analog switch ST(j) is rendered ON and at the same time, a resetting analog switch SR(j−1) on a signal reading-out line 103(j−1) short of said signal reading-out line by one is rendered into its ON state, and the capacitance CR(j−1) of the signal reading-out line 103(j−1) is reset to a potential Vbb. That is, when the potential of each electrostatic capacitance CR(j) is read out, this electrostatic capacitance is reset to Vbb at the next clock timing, and the apparatus becomes ready for the next signal transfer cycle.

By the above-described operation being repeated each time the row selection by the X-shift resistor is put forward successively, signals can be read out from all probe electrodes P(j, k) arranged in the form of a matrix and can be output time-serially. Further, by applying a writing-in potential Vw or an erasing potential Vd instead of the reading bias potential Vr, writing-in or erasing can be effected at the same timing as reading-out.

Figure 13:
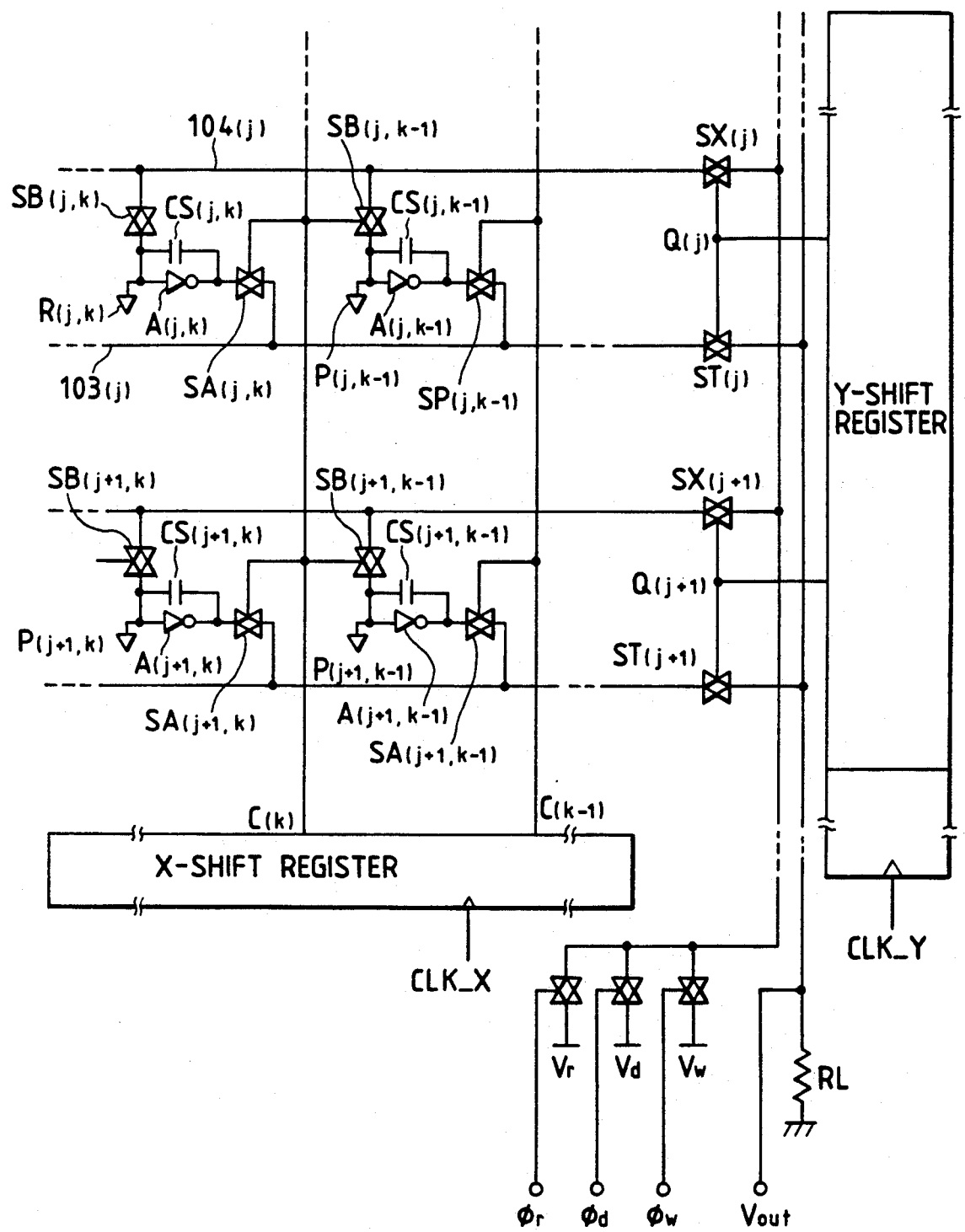
FIG. 13 is a circuit diagram of another multiprobe head suitable for use in the information processing apparatus of the present invention.
Figure 14:
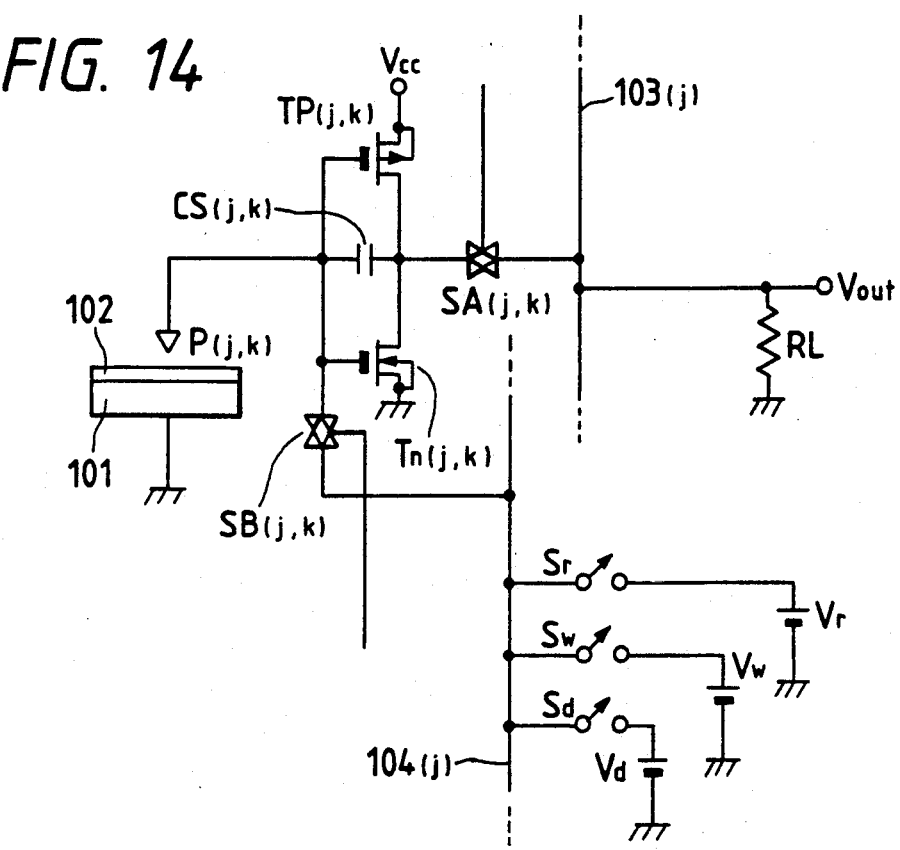
FIG. 14 is a diagram of an equivalent circuit around the probes in the j column and k row of the probe array portion shown in FIG. 13.
Figure 15:
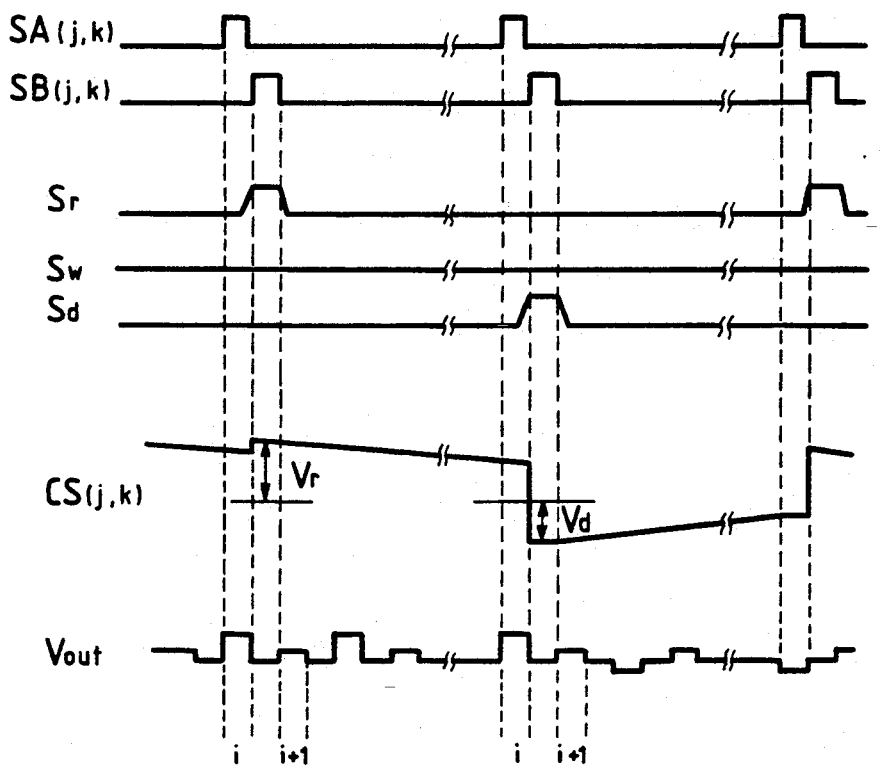
FIG. 15 is a timing chart illustrating the operation of the circuit shown in FIG. 14.

FIG. 13 shows another circuit construction. FIG. 14 shows an equivalent circuit in the probes in the j column and k row of the probe array unit of FIG. 13, and FIG. 15 is a timing chart illustrating the operation thereof.

In FIG. 14, TP(j, k) and Tn(j, k) designate MOS type transistors of p-channel and n-channel, respectively. These transistors are combined to constitute a CMOS type amplifier. SA(j, k) denotes an analog switch for transferring the output of the CMOS type amplifier to a signal reading-out line 103(j). RL designates a load resistor connected to the signal reading-out line 103(j).

The reading-out of data in this circuit construction is accomplished by converting a variation in the potential of the electrostatic capacitance CS(j, k) caused by charges stored in the electrostatic capacitance CS(j, k) flowing into the recording medium layer 102 via the probe electrode P(j, k) into an impedance by the CMOS type amplifier and reading out the same.

The procedure of this operation will hereinafter be described with reference to the timing chart of FIG. 15. The switch Sr is first put into its ON state and a bias voltage source Vr is connected to a voltage supply line 104(j). At this time, the analog switch SB(j, k) is put into its ON state and the electrostatic capacitance CS(j, k) is charged to a potential Vr, whereafter the analog switch SB(j, k) is again put into its OFF state. The probe electrode P(j, k) at this time is placed at a predetermined location on the recording medium from which data is to be read out.

The charges of the electrostatic capacitance CS(j, k) flows into the recording medium layer 102 via the probe electrode P(j, k), and the magnitude of this current flowing into the recording medium layer is determined by the recording state of the recording medium layer 102. A detecting circuit comprised of transistors TP(j, k) and Tn(j, k) and the electrostatic capaicty CS(j, k) constitutes a so-called integration circuit using a capacitor for the negative feedback of the amplifier. By this circuit, the amount of charges discharged from the electrostatic capacitance CS(j, k) is converted into a voltage value, and the output impedance at this time is rendered into a sufficiently low value by a CMOS type transistor. After the lapse of a predetermined time, the analog switch SA(j, k) is turned ON, the output of the CMOS type amplifier is transferred to the signal reading-out line 103(j), and the potential at this time is read out from Vout.

By the above-described operation being repeated with respect to the respective probe electrodes P(j, k) in succession, the variation in the tunnel current attributable to the uneven modulation or the variation in the electron state in the recording medium layer 102 can be read out as a variation in the potential of the electrostatic capacitance CS(j, k).

In the erasing operation, the switch Sd is put into its ON state and the bias voltage source potential Vd is connected to the voltage supply line 104(j). The probe electrode P(j, k) is placed at a predetermined writing-in position on the recording medium, the analog switch SB(j, k) is turned ON, the electostatic capacitance CS(j, k) is charged to the potential Vd, and the switch SB(j, k) is again put into its OFF state.

The writing-in operation is similar to the above-described erasing operation, but the bias voltage source connected to the voltage supply line 104(j) is set to a potential Vw instead of the potential Vd, and the voltage necessary for the writing-in of recording bits is charged to the electrostatic capacitance CS(j, k).

As regards the reading-out operation, a variation in the voltage caused by the discharging or charging of the charges of the electrostatic capacitance is used to detect the tunnel current and therefore, the circuit is of a low current and a high impedance, and yet it is not liable to be affected by heat noise and thus, signal reading-out which is high in S/N ratio and small in the irregularity between the bits can be accomplished. Further, the output impedance is set to a low value by the CMOS type amplifier and therefore, even if the number of the probe electrodes becomes great, the time required for signal transfer can be shortened and reading-out which is rapid and high is S/N ratio becomes possible. Also, the outputs of the individual probes are amplified near the probe electrodes on the head and therefore, the influence of the crosstalk between the probe electrodes by the matrix wiring can be almost eliminated.

The plurality of probe electrodes, as shown in FIG. 13, are arranged in the form of a matrix of m and n by an X-shift resistor and a Y-shift resistor. The output lines C(k) of the X-shift resistor are connected to the gate electrodes of signal transferring analog switches SA(j, k) and SB(j, k−1) provided on the respective probe electrodes. Also, the output line Q(j) of the Y-shift resistor is connected to the respective gate electrodes of an analog switch ST(j) connected to the signal reading-out line like an analog switch SX(j) connected to the voltage supply line in the corresponding column.

One output C(k) of the X-shift resistor is selected, the signal transferring analog switch SA(j, k) in the corresponding row becomes ON, and the charges of the electrostatic capacitance CS(j, k) are transferred to the signal reading-out line 103 in each column. Also, when this row is selected, a charging analog switch SB(j, k−1) in the row short of said row by one also becomes ON, and the electrostatic capacitance CS(j, k−1) is charged from the voltage supply line 104(j) in each column.

The signal output from a signal reading-out line 103 in each column is multiplexed by the analog switch ST(j) driven by the Y-shift resistor, and is output from Vout via a signal line 105.

By the above-described operation being repeated each time the row selection by the X-shift resistor is put forward in succession, signals read out from all probe electrodes P(j, k) arranged in the form of a matrix can be output time-serially. Further, by applying a writing-in or erasing voltage instead of the reading bias Vr, writing-in or erasing can be accomplished at the same timing as reading-out.

Figure 16:
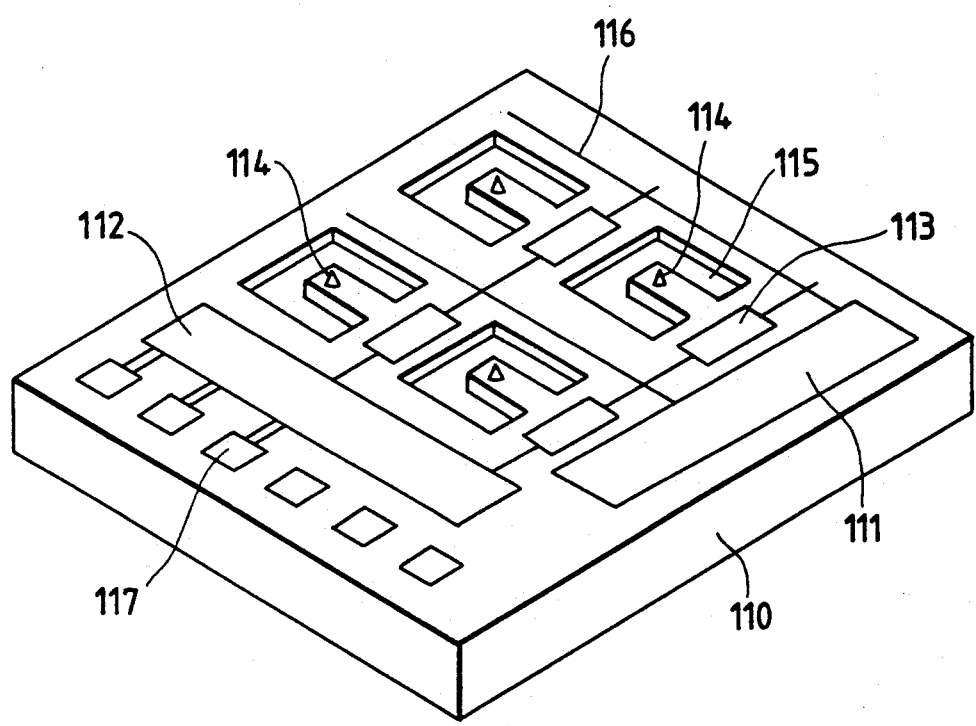
FIG. 16 is a perspective view of a multiprobe head constructed integrally on a silicon substrate.

FIG. 16 is a perspective view of an embodiment in which a multiprobe head 110 comprising the above-described circuit construction is constructed on the same substrate. In this embodiment, a silicon substrate is used as the substrate 101, and the embodiment is comprised of an X-shift resistor 111, a Y-shift resistor 112, a circuit portion 113 including an electrostatic capacitance, a switch element, an amplifier, etc., probe electrodes 114, cantilevers 115, matrix wiring 116, etc., and these circuits are formed by the silicon IC manufacturing process. Also, bonding pads 117 for connecting signal lines together are provided on the multiprobe head 110, and these bonding pads 117 are disposed on one side or two opposed sides of the head 110. Thus, the recording medium can be moved in a direction parallel to the bonding pads 117 to thereby effect recording and reproduction.

Further, these circuits use elements of low power consumption such as chiefly CMOS type circuits and therefore are almost free of heat generated by a circuit current and do not adversely affect the position control of the probe electrodes.

In FIG. 16, driving elements are integrally formed by the use of a silicon substrate, whereas the present invention is not restricted to the silicon substrate, but use may be made of a wafer provided by epitaxially growing thin silicon film on a sapphire substrate, and further a semiconductive layer and a substrate in any and all forms such as thin polysilicon film grown on a quartz substrate and solid phase epitaxial film.

Figure 17:
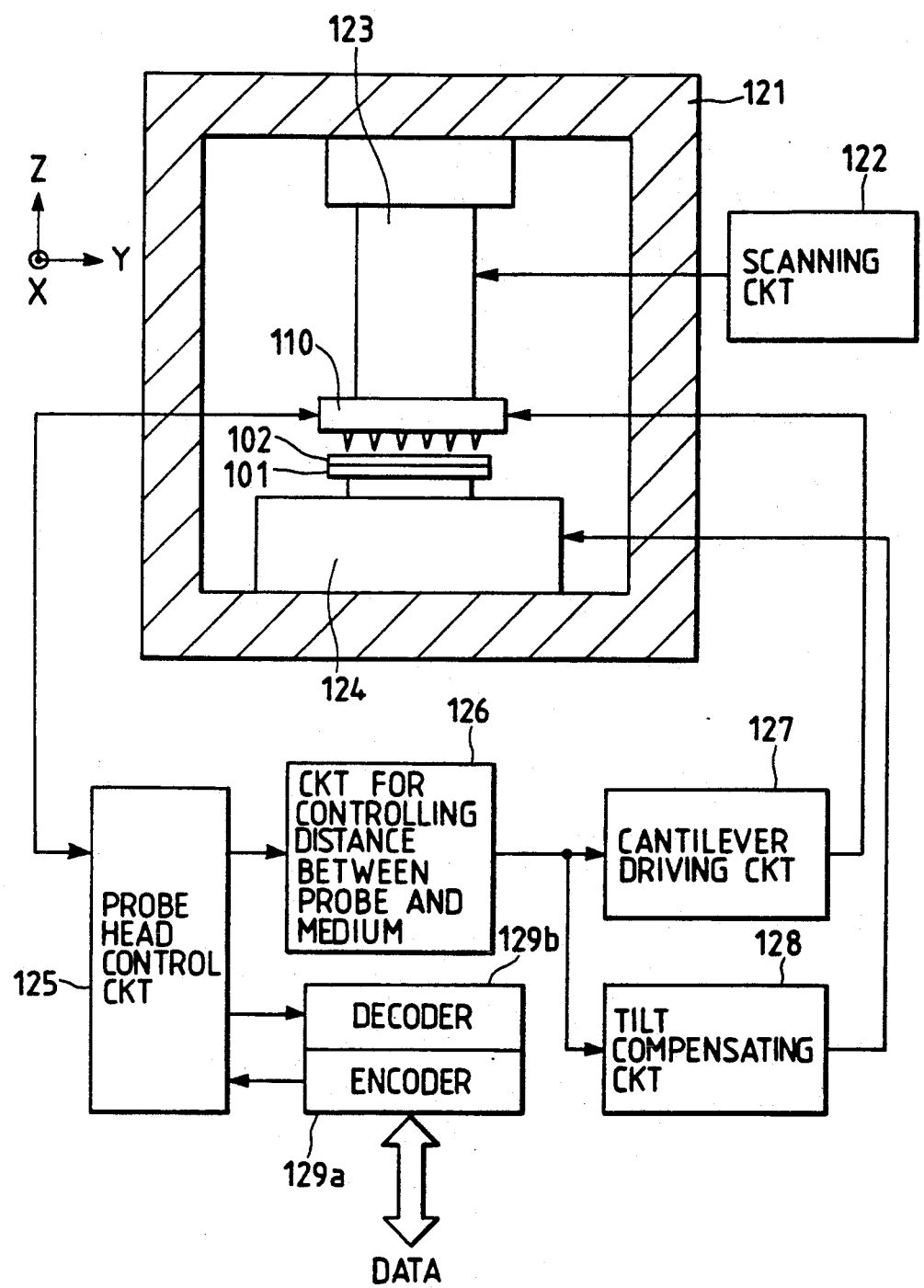
FIG. 17 is a block diagram showing an example of the information processing apparatus provided with a multiprobe head having the circuit construction shown in FIGS. 10 and 13.

FIG. 17 diagrammatically shows the construction of an information processing apparatus having a multiprobe head provided with the above-described circuit construction. A multiprobe head 110 is mounted on the upper portion of a structure 121 with an actuator 123 which is driven by a scanning circuit 122 interposed therebetween, and in opposed relationship therewith, the substrate 101 of a recording medium is mounted on the lower portion of the structure 121 with an actuator 124 interposed therebetween. The multiprobe head 110 is connected to a probe head control circuit 125, the output of which is parallel-connected to a cantilever driving circuit 127 and a tilt compensating circuit 128 through a circuit 126 for controlling the distance between probe and medium. The output of the cantilever driving circuit 127 is connected to the multiprobe head 110, and the output of the tilt compensating circuit 128 is connected to the actuator 124. Also, the probe head control circuit 125 is connected to an encoder 129a and a decoder 129b which effect the inputting and outputting of data.

Writing-in data is encoded by the encoder 129a and is transferred to the probe head control circuit 125, and the multiprobe head 110 is driven to write the data into a recording medium layer 102. When the reading-out of data is to be effected, an address to be read out is generated by a processor, not shown, to thereby drive the probe head control circuit 125. The probe head control circuit 125 reads out the signal of each probe from the multiprobe head 110 in accordance with this address, and transfers it to the decoder 129b. The decoder 129b effects error detection or error correction from this signal and outputs data.

The information of a tunnel current flowing through each probe electrode is directly read out by the probe head control circuit 125, the deviation from a reference position is detected by the circuit 126 for controlling the distance between probe and medium, the Z direction control of the individual probe electrodes 114 is effected by the cantilever driving circuit 127, and when it is necessary to correct the posture of the multiprobe head 110, it is effected by the probe head control circuit 125.

Figure 18:
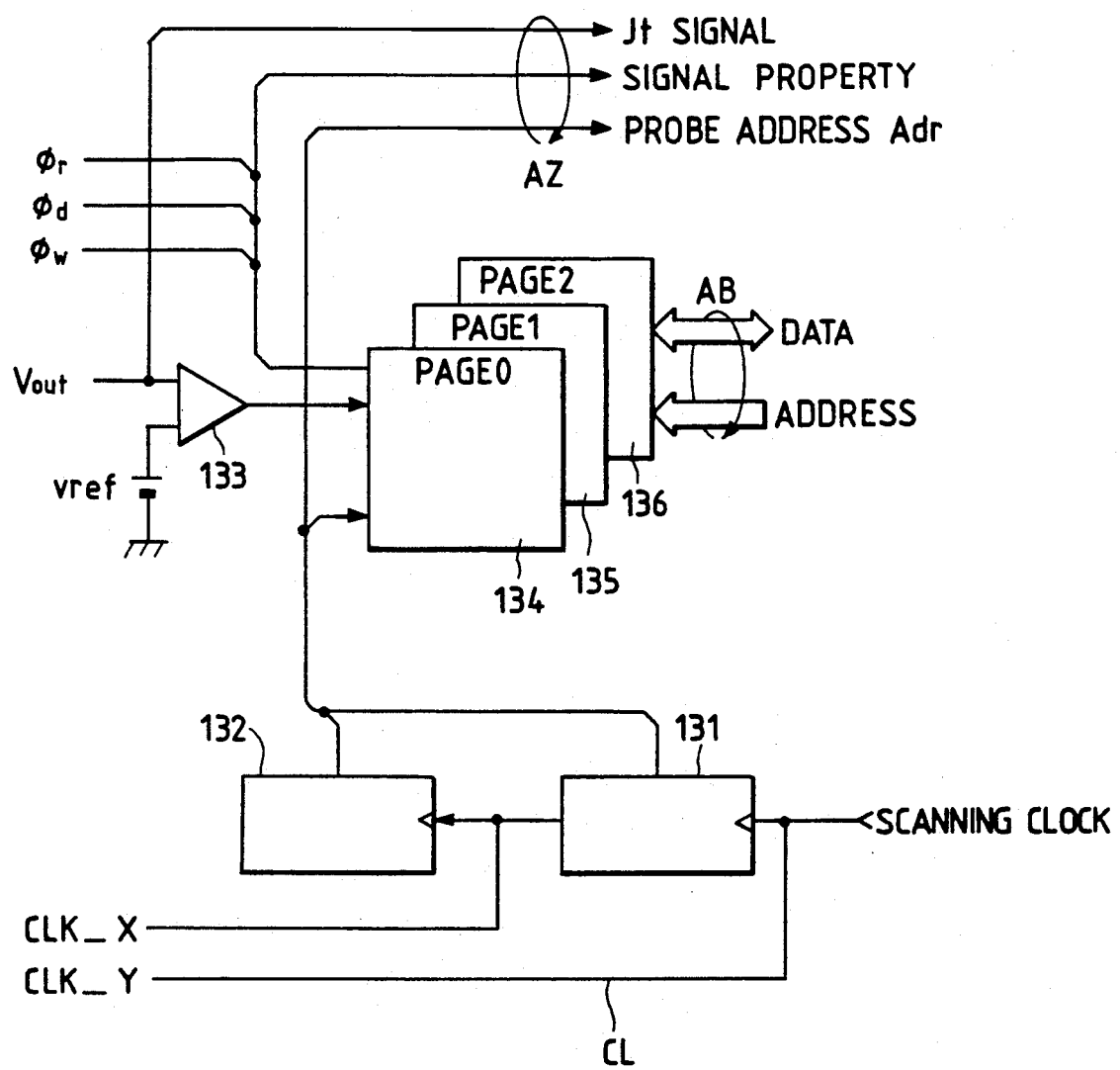
FIG. 18 is a block diagram of a probe head control circuit shown in FIG. 17.

FIG. 18 shows a detailed block diagram of the writing-in and reading-out control circuit 125 of FIG. 17. The timing for accessing each probe electrode 114 is effected with a scanning clock CL as the reference. This scanning clock CL is made into the clock signal CLK-Y of the multiprobe head 110, and further is input to a Y-address counter 131. This Y-address counter 131 has the same count number as the number of steps of the Y-shift resistor 112 of the multiprobe head 110. The carry output of the Y-address counter 131 is made into the clock signal CLK-X of the multiprobe head 110, and further is input to an X-address counter 132. This X-address counter 132 has the same count number as the number of steps of the X-shift resistor 111 of the multiprobe head 110. The count outputs of the X-address counter 132 and the Y-address counter 131 are defined as a probe address Adr.

The reading-out output Vout from the multiprobe head 110 is input to a comparator 133. The comparator 133 binarizes the output with a reference voltage Vref as the reference. This binarized output is written into the recording unit of probe control tables 134–136 designated by the probe address Adr.

The probe control tables 134–136 have one to several pages each of which is temporary preservation memory comprised of the same number of recording units as the number of probes of the multiprobe head 110. Each recording unit records the logical value of recording data read out from the multiprobe head 110 and in addition, a logical value of at least six values including a driving state value supporting the operation of reading-out, ON writing-in, OFF writing-in or erasing.

During the accessing of the multiprobe head 110, signals $\Phi r$, $\Phi d$ and $\Phi w$ are produced so as to control the corresponding probe electrode 114 in accordance with the driving state value of each unit of the probe control tables 134–136.

When data is to be read out from the multiprobe head 110, the probe electrode 114 is first scanned to a predetermined position on the recording medium, and then the driving state value of the reading-out operation is registered in a recording unit corresponding to the address of the probe electrode 114 which should read out the data of the probe control tables 134–136 by a host control CPU, not shown, through a data bus and an address bus AB. After the series of reading-out operations of the multiprobe head 110 are terminated, the read-out logical value of the recording unit of the previously designated probe address Adr is read out, and error detection or error correction is effected by the encoder 129a, thus completing the reading-out operation.

Also, when writing-in is to be effected, input data is encoded by the encoder 129a, whereafter the logical value of the code word is registered as the driving state value into each recording unit of the probe control tables 134–136. On the basis of this registered logical data, writing-in signals are successively transferred to the multiprobe head 110.

Here, a recording unit does not register the writing-in or erasing operation on end for an access cycle for each page. That is, a probe electrode 114 does not permit the writing operation on end, and writing-in or erasing is effected while the reading-out operation is performed without fail. This is necessary to control the spacing between the probe electrode 114 and the recording medium by the signal amplitude during reading-out.

Further, writing or erasing is not registered into all recording units in a page. That is, it never happens that all probe electrodes 114 of the multiprobe head 110 which are arranged in the form of a matrix perform the writing-in operation at a time. This is necessary to control the tilt so that the multiprobe head 110 may always be held in parallelism to the recording medium.

The control of these probe electrodes 114 in Z direction and the control of the tilt of the probe head 110 are effected by the circuit 126 for controlling the distance between probe and medium, by the use of a probe Z control signal line AZ comprised of the properties of a signal Jt corresponding to the tunnel current produced from the signal Vout and signals produced from the signals $\Phi r$, $\Phi d$ and $\Phi w$, and a probe address. That is, the circuit 126 for controlling the distance between probe and medium refers to the probe control tables 134–136 and drives the cantilever driving circuit 127 and the tilt compensating circuit 128 on the basis of the output signal Vout of the probe electrode 114 which is in the reading-out operation state.

The cantilevers 115 each have the probe electrode 114 and in addition, an electrostatic actuator or a piezoelectric actuator, not shown, and are individually designed so as to be capable of controlling the distance between the probe electrode and the recording medium. These actuators are driven by a circuit, not shown, provided in the multiprobe head 110, in conformity with a signal sent from the cantilever driving circuit 127.

By the use of the writing-in and reading-out control method based on the above-described probe control tables 134–136, the arrangement of the probe electrodes 114 which should be placed in the reading-out state can be freely controlled and all the probe electrodes 114 can be controlled so as to assume a uniform writing-in and reading-out proportion. By such control, the control of the probe electrodes 114 in Z direction can be accomplished stably and rapidly without the data of writing-in and erasing being resorted to.

Figure 19:
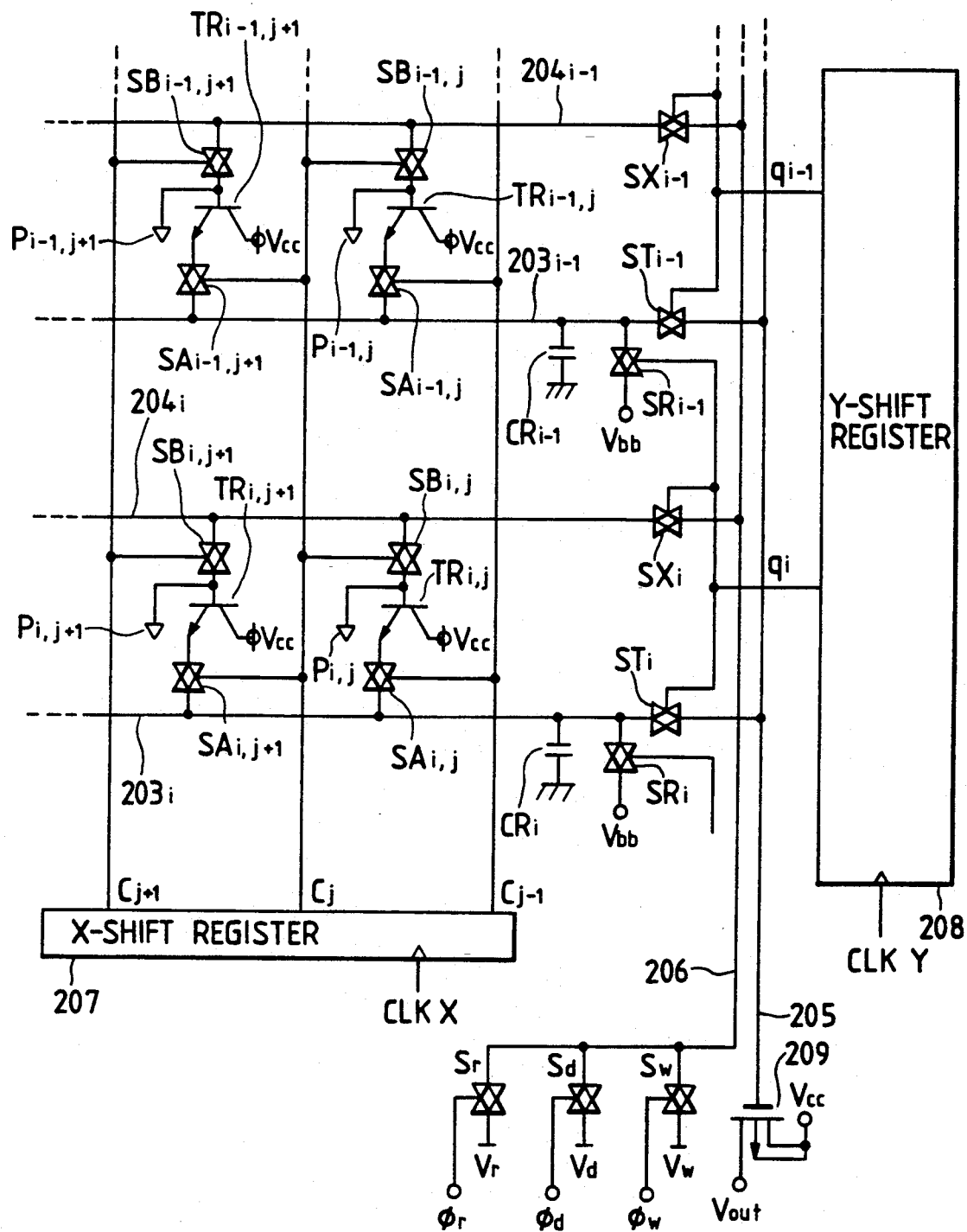
FIG. 19 is a circuit diagram of still another multiprobe head suitable for use in the information processing apparatus of the present invention.

Description will now be made of still another circuit construction of the multiprobe head. FIG. 19 is a block diagram showing the circuit construction of the multiprobe head. This multiprobe head has its probe electrodes arranged in the form of a matrix of m×n.

The entire circuit construction will first be described with reference to FIG. 19. There are provided an x-shift resistor 207 to which a clock $CLK_x$ is input and which has n+1 output lines $C_0$-$C_n$ and a y-shift resistor 208 to which a clock $CLK_y$ is input and which has m+1 output lines $q_1$-$q_{m+1}$. Correspondingly to the output lines $q_1$-$q_m$, there are provided m signal reading-out lines $203_1$-$203_m$ and m voltage supply lines $204_1$-$204_m$. One end of each of the signal reading-out lines $203_1$-$203_m$ is connected to a common signal line 205 through analog switches $ST_1$-$ST_m$ so that a bias voltage Vbb may be applied thereto through analog switches $SR_1$-$SR_m$. This bias potential Vbb is a bias potential for keeping an MOSFET (MOS field effect transistor) 209 which will be described later active. Also, one end of each of the voltage supply lines $204_1$-$204_m$ is connected to a common bias line 206 through analog switches $SX_1$-$SX_m$. The analog switches $ST_1$-$ST_m$ and $SX_1$-$SX_m$ are gate-controlled by the corresponding output lines $q_1$-$q_m$, and the analog switches $SR_1$-$SR_m$ are gate-controlled by the output lines $q_2$-$q_{m+1}$. That is, the analog switches $ST_i$ and $SX_i$ are gate-controlled by the ith ($1 \leq i \leq m$) output line $q_i$, and the analog switch $SR_i$ is gate-controlled by the i+1th output line $q_{i+1}$. Further, load capacities $CR_1$-$CR_m$ are equivalently connected to the signal reading-out lines $203_1$-$203_m$, respectively. The values of the load capacities $CR_1$-$CR_m$ are e.g. of the order of several pF.

One end of the signal line 205 is connected to the gate of the MOSFET 209, and a source voltage Vcc is supplied to the source of this MOSFET 209, the drain of which is connected to an output terminal Vout. A writing-in bias voltage Vw, an erasing bias voltage Vd and a reading-out bias voltage Vr are applied to the bias line 206 through three analog switches Sw, Sd and Sr, respectively. The analog switches Sw, Sd and Sr are gate-controlled by a writing-in clock signal $\phi$w, an erasing clock signal $\phi$d and a reading-out clock signal $\phi$r, respectively.

There are provided m and n probe electrodes $P_{1,1}$-$P_{m,n}$, and correspondingly to these probe electrodes $P_{1,1}$-$P_{m,n}$, there are provided analog switches $SA_{1,1}$-$SA_{m,n}$, $SB_{1,1}$-$SB_{m,n}$ and bipolar type transistors $TR_{1,1}$-$TR_{m,n}$. All of the circuits around the probe electrodes $P_{1,1}$-$P_{m,n}$ are the same and therefore, description will be made of the probe electrodes $P_{i,j}$ in the i column and the j row ($1 \leq i \leq m$, $1 \leq j \leq n$). A source voltage Vcc is applied to the collectors of the transistors $TR_{i,j}$, and the probe electrodes $P_{i,j}$ are connected to the base of these transistors. Further, these bases are connected to the ith voltage supply line $204_i$ through analog switches $SB_{i,j}$.

These analog switches $SB_{i,j}$ are gate-controlled by the jth output line $c_j$ from the x-shift resistor 207. The emitters of the transistors $TR_{i,j}$ are connected to the ith signal reading-out line $204_i$ through analog switches $SA_{i,j}$, which are gate controlled by the j−1th output line $c_{j-1}$ from the x-shift resistor.

Figure 20:
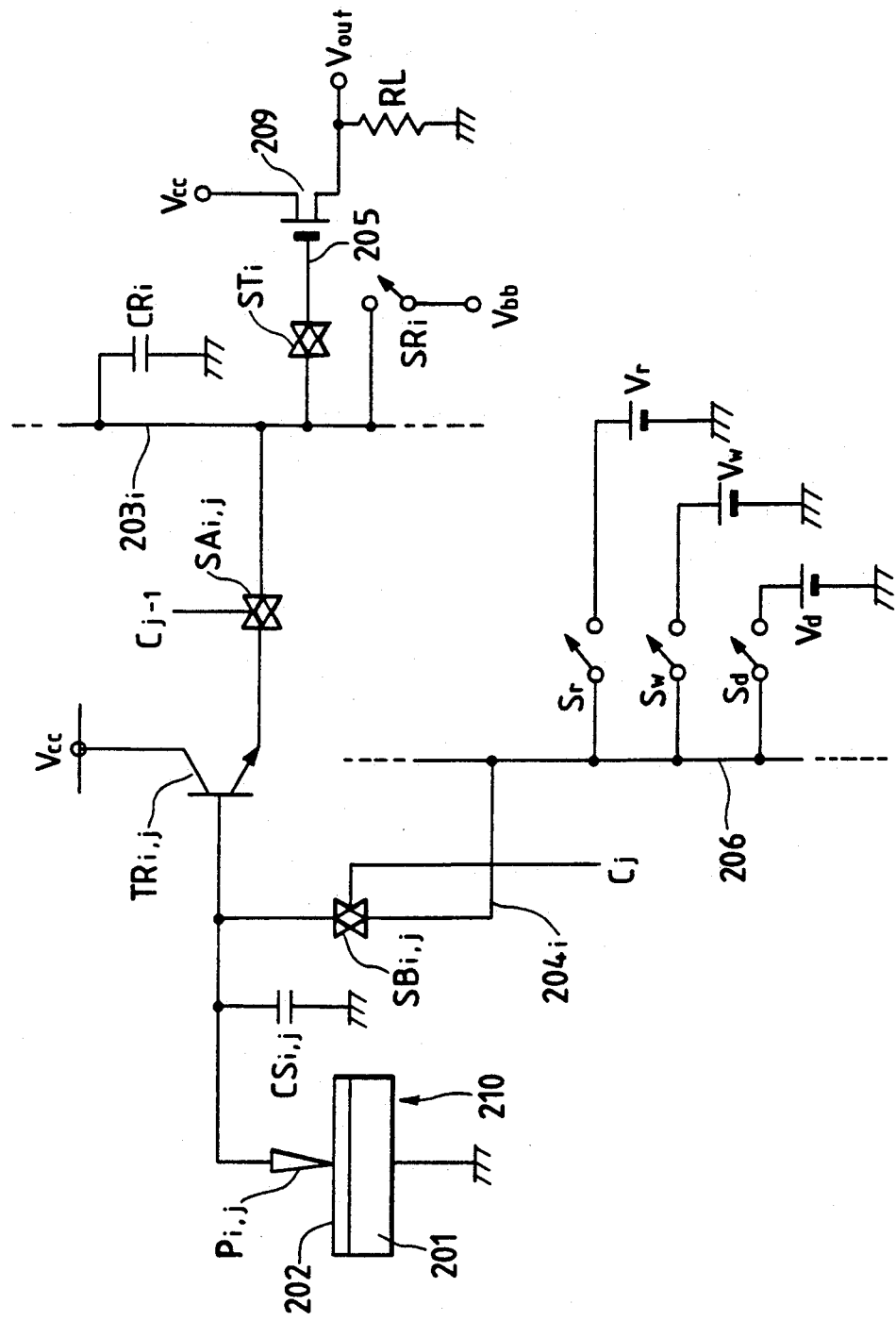
FIG. 20 is a diagram of an equivalent circuit when in the multiprobe head of FIG. 19, attention being paid to probe electrodes Pi and Pj in i column and j row.

The multiprobe head is constructed as described above, whereby the equivalent circuit diagram when attention is paid to the probe electrodes $P_{i,j}$ in the i column and the j row of the plurality of probe electrodes is such as shown in FIG. 20. That is, the tip ends of the probe electrodes $P_{i,j}$ are opposed to a recording medium layer 202 provided on a substrate 201. A recording medium 210 is constituted by the substrate 201 and the recording medium layer 202. As the recording medium layer 202, use can be made of a recording material having the above-described memory effect or metallic thin film capable of being formed with minute unevenness.

The probe electrodes $P_{i,j}$ are connected to the bases of the transistors $TR_{i,j}$, the base capacities $CS_{i,j}$ of which are equivalently inserted between the bases and the ground. Further, these bases are connected to a bias line 206 through analog switches $SB_{i,j}$ and the voltage supply line $204_i$. A reading-out bias voltage Vr, a writing-in bias voltage Vw and an erasing bias voltage Vd are applied to the bias line 206 through analog switches Sr, Sw and Sd, respectively.

The source voltage Vcc is supplied to the collectors of the transistors $TR_{i,j}$, the emitters of which are connected to a signal reading-out line $203_i$ through the analog switches $SA_{i,j}$. As described above, the load capacitance $CR_i$ is equivalently connected to the signal reading-out line $203_i$ so that the bias potential Vbb may be applied thereto through the analog switch $SR_i$. The signal reading-out line $203_i$ is connected to the gate of the MOSFET 209 through a signal line 205. The source voltage Vcc is applied to the source of the MOSFET 209, and a load resistor RL and the output terminal Vout are connected to the drain of the MOSFET.

The operation of this multiprobe head will now be described. The principle of the reading-out of signals in this multiprobe head resides in that a variation in the base potential caused by charges which are stored in the base capacitances $CS_{i,j}$ of the transistors $TR_{i,j}$ flowing out into the recording medium layer 202 via the probe electrodes $P_{i,j}$ is transferred to the load capacitor $CR_i$ of the signal reading-out line $203_i$ through an emitter follower circuit and analog switches $SA_{i,j}$, and the potential of this load capacitance $CR_i$ is taken out by a source follower circuit comprising the MOSFET 209 through the analog switch $ST_i$. The base capacitances $CS_{i,j}$ must be charged to a predetermined voltage prior to reading-out, and this voltage is supplied from the bias line 206 through the voltage supply line $204_i$ and the analog switches $SB_{i,j}$. Also, a voltage necessary for the writing-in and erasing of data is likewise supplied from the bias line 206 to the probe electrodes $P_{i,j}$.

The operation to the probe electrodes $P_{i,j}$ will hereinafter be described in greater detail with reference to the timing chart of FIG. 21. It is to be understood that the probe electrodes $P_{i,j}$ are opposed to a predetermined position for reading-out the data of the recording medium layer 202.

The analog switch Sr is first put into its ON state and a reading-out bias voltage Vr is applied to the voltage supply line $204_i$. When in this state, the output line $c_j$ is rendered in its ON state and the analog switches $SB_{i,j}$ are rendered into their ON state, the base potential of the transistors $TR_{i,j}$ becomes the reading-out bias voltage Vr and the base capacitances $CS_{i,j}$ are charged to this potential. Thereafter, the analog switches $SB_{i,j}$ are rendered into their OFF state. Charges stored in the base capacitances $CS_{i,j}$ flow out from the probe electrodes $P_{i,j}$ to the recording medium layer 202, and the potential of the probe electrodes $P_{i,j}$, i.e., the base potential of the transistors $TR_{i,j}$ drops gradually. The current flowing out from the probe electrodes $P_{i,j}$, i.e., the tunnel current, differs depending on the recording state of the recording medium layer 202 and therefore, the base potential of the transistors $TR_{i,j}$ after the lapse of a predetermined time ought to differ depending on the recording state.

After the lapse of a predetermined time, the output line $q_{i+1}$ is rendered into its ON state, the analog switches $SR_{i,j}$ are rendered into their ON state, and the potential of the signal reading-out line $203_i$ is set to the bias potential Vbb. As a result, the load capacity $CR_i$ of the signal reading-out line $203_i$ is also charged to this potential. The analog switches $SR_{i,j}$ are then put into their OFF state, and immediately after that, the output line $c_{j-1}$ is rendered into its ON state and the analog switches $SA_{i,j}$ are rendered into their ON state. As a result, the base potential of the transistors $TR_{i,j}$ at this time is transferred to the load capacitance $CR_i$ of the signal reading-out line $203_i$ by the emitter follower circuit comprising the transistors $TR_{i,j}$. The potential of the load capacity $CR_i$ varied as a result of the transfer is indicated by arrow in FIG. 21. By keeping $h_{fe}$ of the transistors $TR_{i,j}$ sufficiently great (e.g. several hundred or more), the base potential thereof is transferred to the load capacitance $CR_i$ without being decreased. The potential of the load capacitance $CR_i$ at this time is output to the terminal Vout by the source follower circuit comprising the MOSFET 209 through the analog switch $ST_i$.

Figure 21:
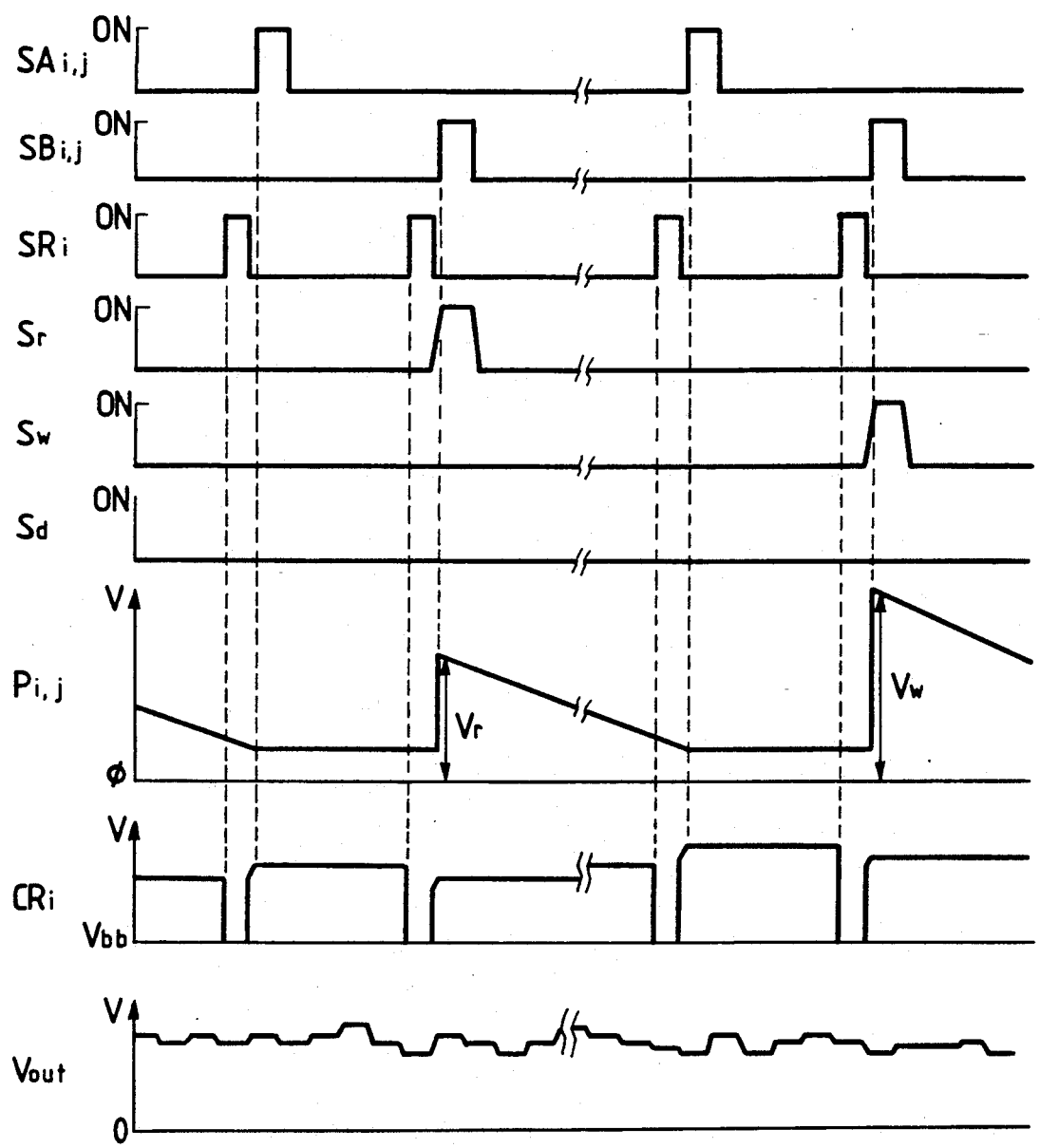
FIG. 21 is a timing chart of the multiprobe head shown in FIG. 19.

In FIG. 21, the state of the analog switches $SR_{i,j}$ changes to OFF→ON→OFF a plurality of times until the analog switches $SA_{i,j}$ become ON after the state of the analog switches $SB_{i,j}$ changes to OFF→ON→OFF. Of these changes, the other change than those immediately before the analog switches $SA_{i,j}$ become ON is used for the charging of the load capacity for the reading-out of data from the other probe electrodes than the probe electrodes $P_{i,j}$. The time interval from after the analog switches $SB_{i,j}$ become ON until the analog switches $SA_{i,j}$ become ON is controlled so as to be always constant.

By the above-described operation being repeated with respect to the probe electrodes in succession, any variation in the tunnel current attributable to the unevenness of the surface or the electron state in the recording medium layer 202 can be read out as a variation in the base potential of the transistors $TR_{i,j}$, and data can be read out well from the recording medium layer 202.

The recording operation will now be described. Here, the recording of two values, i.e., the recording of "0" and the recording of "1", are called the erasing operation and the writing-in operation, respectively. When the writing-in operation is to be performed, the analog switch Sw is put into its ON state and a writing-in bias voltage Vw is applied to the voltage supply line $204_i$. The probe electrodes $P_{i,j}$ are opposed to a predetermined recording position on the recording medium layer 202, the analog switches $SB_{i,j}$ are put into their ON state, the writing-in bias voltage Vw is applied to the probe electrodes $P_{i,j}$, and the analog switches $SB_{i,j}$ are again put into their OFF state. The potential of the probe electrodes $P_{i,j}$ drops gradually as during reading-out. The writing-in bias voltage Vw, when such a $\pi$ electron family compound that is modulated by a voltage exceeding a certain threshold value is used as the recording medium layer 202, is a voltage exceeding that threshold value. Also, where recording is effected by the use of the partial melting or evaporation of the surface of metallic thin film, use is made of a value given by the following expression from energy E necessary for the formation of bits:

$$Vw \geq [2E/Ccs]^{\frac{1}{2}}$$

where Ccs is the value of the base capacitances $CS_{i,j}$.

By this voltage, writing-in bits are formed on the recording medium layer 202. When the erasing operation is to be performed, an erasing bias voltage Vd can applied to the voltage supply line $204_i$ in the same manner to thereby put the analog switches $SB_{i,j}$ into their ON state, and a voltage necessary for the erasing of the recording bits can be applied to the probe electrodes $P_{i,j}$.

In this circuit construction, the operation of reading-out data from the recording medium layer is accomplished by causing an electrostatic capacitance having charges pre-stored therein to be discharged by the tunnel current, and reading-out the potential of the electrostatic capacitance after the discharging by an active element. Of course, the electrostatic capacitance may be charged with the tunnel current and the potential of the electrostatic capacitance after charged may be read out by an active element. By the variation in the potential of the electrostatic capacitance by the tunnel current being thus read out by the active element, signal reading-out having a high S/N ratio and small irregularity between bits can be accomplished. Also, in the writing-in and erasing operations, the amount of poured-in charges and the amount of energy necessary for the writing into or the erasing of the recording medium layer can be prescribed by the value of the electrostatic capacitance and the charging voltage and therefore, even when the tunnel gap between the probe and the recording medium layer varies, no abnormal current flows and writing-in and erasing can be accomplished stably and with good reproducibility.

Here, the operation of selecting particular probe electrodes $P_{i,j}$ from among a plurality of probe electrodes will be described supplementally.

The output line $c_{j-1}$ of the X-shift resistor 207 is selected, the signal transferring analog switches $SA_{i,j}$ in the corresponding row turns ON, and the base potential of the transistors $TR_{i,j}$ is transferred to the signal reading-out line $203_i$ in the column. During the selection of this row, the charging analog switches $SB_{i,j-1}$ in the row short of said row by one also turn ON and the base potential of the transistors $TR_{i,j-1}$ is charged from the voltage supply line $204_i$. A signal transferred from the signal reading-out line $203_i$ in each column to the load capacitance $CR_i$ is multiplexed by the analog switch $ST_i$ driven by the Y-shift resistor 208 and is output to the signal line 205, and is impedance-converted by the MOSFET 209 and is thereafter output. At this time, the analog switch $ST_i$ is turned ON and at the same time, the analog switch $SR_{i-1}$ on the signal reading-out line $203_{i-1}$ in the column short of said column by one also turns ON, and the load capacitance $CR_{i-1}$ of this signal reading-out line $203_{i-1}$ is reset to the bias potential Vbb. That is, when the potential of each load capacitance $CR_i$ is read out, each load capacitance $CR_i$ is reset to the bias potential Vbb at the next clock timing, thus becoming ready for the next signal transfer cycle.

The above-described operation is repeated each time the row selection by the X-shift resistor 207 is put forward, whereby signals can be read out from all probe electrodes arranged in the form of a matrix and be time-serially output. Further, by applying the writing-in bias voltage Vw or the erasing bias voltage Vd instead of the reading-out bias voltage Vr, writing-in or erasing can be accomplished at the same timing as reading-out.

In this circuit construction, the outputs of the individual probe electrodes are amplified near the respective probe electrodes on the head and therefore, the influences of the crosstalk between the probe electrodes by the matrix wiring and the switching noise of the switch elements can be almost eliminated and reading-out of a high S/N ratio becomes possible. In this circuit construction, transistors are used as active elements, but alternatively, FETs may be used as active elements to provide a source follower circuit construction.

Figure 22:
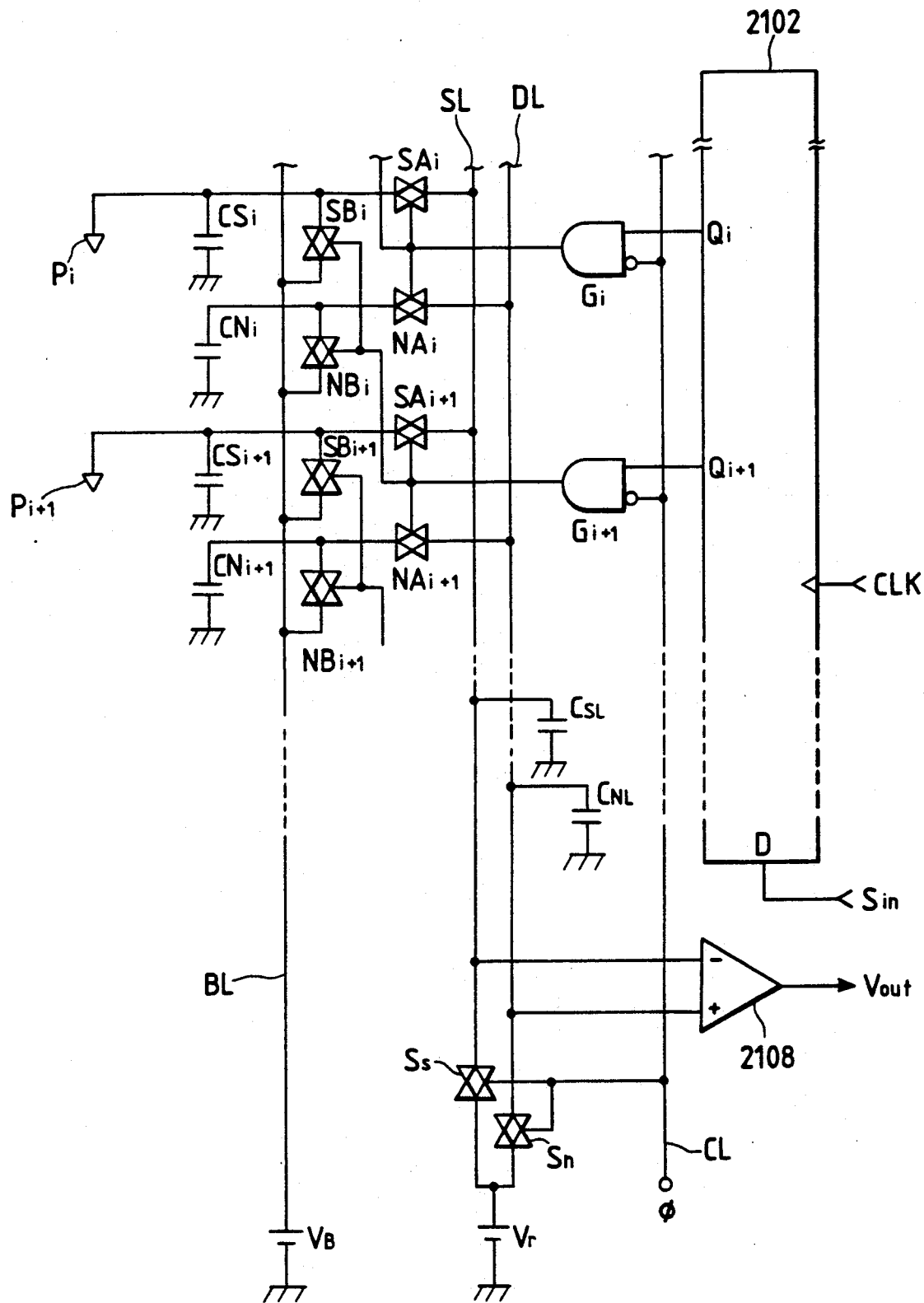
FIG. 22 is a block diagram showing another circuit construction of the multiprobe head suitable for use in the information processing apparatus of the present invention.
Figure 23:
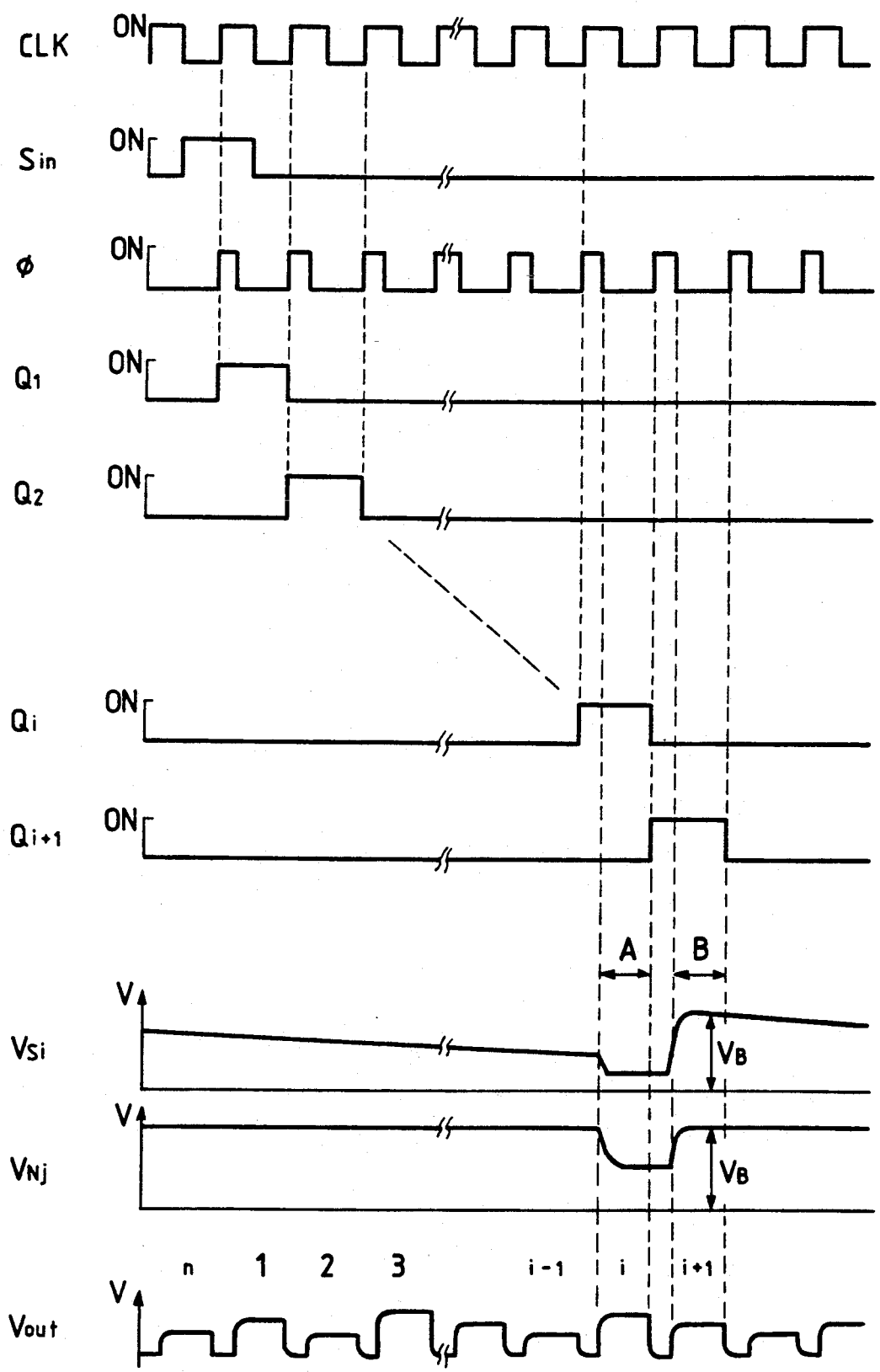
FIG. 23 is a timing chart of the multiprobe head shown in FIG. 22.

Description will now be made of yet still another circuit construction of the multiprobe head. FIG. 22 is a block diagram showing the circuit construction of this multiprobe head, and FIG. 23 is a timing chart thereof.

This multiprobe head has k probe electrodes $P_1$-$P_k$, and in common to these probe electrodes $P_1$-$P_k$, there are provided a shift resistor 2102 of k output, a clock line CL, a bias line BL, a signal reading-out line SL, and a dummy reading-out line NL. The shift resistor 2102 starts its shifting operation by a selection signal $S_{in}$ input to the selection terminal D, and renders one of the outputs $Q_1$-$Q_k$ thereof into its ON state in synchronism with a clock CLK supplied from the outside. Gates $G_1$-$G_k$ are provided correspondingly to the outputs $Q_1$-$Q_k$ of the shift resistor 2102. The gates $G_1$-$G_k$, with the corresponding outputs $Q_1$-$Q_k$ of the shift resistor 2102 as one input, has their other inputs connected to the clock line CL, and find and output the logical product of the logical negative value of the other inputs and one input. One end of the bias line BL is connected to a bias voltage source $V_B$. A reading-out bias voltage Vr is supplied to one end of each of the signal reading-out line SL and the dummy reading-out line NL through analog switches $S_S$ and Sn, respectively. These analog switches $S_S$ and Sn are gate-controlled by a transferring clock $\phi$ supplied from the outside to the clock line CL. Load capacitances $C_{SL}$ and $C_{NL}$ are equivalently connected to the signal reading-out line SL and the dummy reading-out line NL, respectively, and these load capacitances $C_{SL}$ and $C_{NL}$ are equal in capacitance value to each other. There is also provided a differential amplifier 2108 for amplifying the potential difference between the signal reading-out line SL and the dummy reading-out line NL, and the output Vout of this differential amplifier 2108 provides the signal output of the entire multiprobe head.

The circuit construction around the respective probe electrodes $P_1$-$P_k$ will now be described with the ith probe electrode $P_i$ as a representative. The other probe electrodes are of the same circuit construction.

Correspondingly to the probe electrode $P_i$, there are provided a charge accumulating electrostatic capacitance $CS_i$, a dummy electrostatic capacitance $CN_i$ and four analog switches $SA_i$, $SB_i$, $NA_i$, $NB_i$ inserted in parallel to the probe electrode $P_i$. The analog switch $SA_i$ is for connecting the probe electrode $P_i$ to the signal reading-out line SL, and the analog switch $NA_i$ is for connecting the dummy electrostatic capacitance $CN_i$ to the dummy reading-out line NL. These analog switches $SA_i$ and $NA_i$ are gate-controlled by the output of the ith gate $G_i$. On the other hand, the analog switches $SB_i$ and $NB_i$ are for connecting the probe electrode $P_i$ and the dummy electrostatic capacitance $CN_i$, respectively, to the bias line BL, and are gate-controlled by the output of the i+1th gate $G_{i+1}$. Design is made such that the charge accumulating electrostatic capacitance $CS_i$ and the dummy electrostatic capacity $CN_i$ have substantially the same electrostatic capacity value, the analog switches $SA_i$ and $NA_i$ are of the same characteristic and the analog switches $SB_i$ and $NB_i$ are of the same characteristic.

The operation of this circuit construction will now be described with reference to FIG. 23. It is to be understood that a clock CLK has a duty ratio of 50% and a transferring clock $\phi$ is synchronized with the clock CLK and has a duty ratio of less than 50%.

The probe electrode $P_i$ is opposed to a predetermined recording position on the recording medium layer. When a selection signal $S_{in}$ is input, the shift resistor 2102 starts its shifting operation and the outputs $Q_1$-$Q_k$ successively become ON. When attention is paid to the probe electrode $P_i$, the charge accumulating electrostatic capacitance $CS_i$ and the dummy electrostatic capacitance $CN_i$ are charged to a bias voltage $V_B$ by the analog switches $SB_i$ and $NB_i$ respectively, when the output $Q_{i+1}$ has become ON in the last transfer cycle. Because of the probe electrode $P_i$ being connected to the charge accumulating electrostatic capacitance $CS_i$, the voltage $V_{Si}$ across the charge accumulating electrostatic capacitance $CS_i$ drops gradually by a tunnel current flowing from the probe electrode $P_i$ to the recording medium layer. On the other hand, because nothing from which a current flows out is connected to the dummy electrostatic capacitance $CN_i$, the voltage $V_{Ni}$ across it does not vary. The magnitude of the tunnel current is varied by the recording state on the recording medium layer and thus, the voltage difference between the electrostatic capacitances $CS_i$ and $CN_i$ after the lapse of a predetermined time is determined depending on this recording state.

In synchronism with the transferring clock $\phi$, the load capacitance $C_{SL}$ of the signal reading-out line SL and the load capacitance $C_{NL}$ of the dummy reading-out line NL are charged to a reading-out bias voltage Vr by analog switches $S_S$ and Sn, respectively. Let it be assumed that the shifting operation of the shift resistor 2102 progresses and the output $Q_i$ becomes ON. The output of the gate $G_i$ is OFF as long as the transferring clock $\phi$ is in its ON state, but it becomes ON (a period A shown in FIG. 23) at the timing whereat the transferring clock $\phi$ falls. As a result, the voltages $V_{Si}$ and $V_{Ni}$ of the charge accumulating electrostatic capacitance $CS_i$ and the dummy electrostatic capacitance $CN_i$ are transferred to the signal reading-out line SL and the dummy reading-out line NL, respectively, by analog switches $SA_i$ and $SA_i$, and the voltages of the load capacitances $C_{SL}$ and $C_{NL}$ vary in conformity with the voltages of the electrostatic capacitances $CS_i$ and $CN_i$, respectively. The potential difference between the two reading-out lines SL and NL is read out and amplified by the differential amplifier 2108 and is output as a signal Vout. This signal varies in conformity with the potential difference between the electrostatic capacitances $CS_i$ and $CN_i$, i.e., the data read out by the probe electrode $P_i$.

When the output $Q_{i+1}$ of the shift resistor 2102 becomes ON, the output of the i+1th gate $G_{i+1}$ becomes ON (a periods B shown in FIG. 23) at the timing whereat the transferring clock $\phi$ falls. At this time, the electrostatic capacitances $CS_i$ and $CN_i$ are charged to a bias voltage $V_B$ by analog switches $SB_i$ and $NB_i$, respectively, thus becoming ready for the next reading-out cycle.

The reading-out operation has been described above with attention paid to the ith probe electrode $P_i$, but actually, with the progress of the shifting operation of the shift resistor 2102, data are successively read out from the respective probe electrodes in synchronism with the clock CLK and output as a signal Vout. That is, in the present embodiment, by the use of the clock CLK or the transferring clock φ synchronized therewith, a series of reading-out operations are repetitively performed with respect to each probe electrode, whereby the variation in the tunnel current attributable to the unevenness modulation or the variation in the electron state in the recording medium layer can be read out as a varied in the potential of the electrostatic capacitance $CS_i$. Also, when the writing-in operation or the erasing operation is to be performed, the writing-in bias voltage Vw or the erasing bias voltage Vd, instead of the reading-out bias voltage Vr, can be applied to the bias line BL and a voltage necessary for the writing-in or erasing of recording bits can be applied to the electrostatic capacitance $CS_i$.

In this circuit construction, the operation of reading out data from the recording medium layer uses the charging or discharging of the electrostatic capacitance by the tunnel current and therefore, in spite of the circuit being of a low current and a high impedance, there can be accomplished signal reading-out which is not liable to be affected by heat noise and which is high in S/N ratio and small in the irregularity between bits. Further, a signal is taken out as the potential difference between the electrostatic capacitance connected to the probe electrode and the dummy electrostatic capacitance and therefore, the influence of the irregularity of the capacitances in the probe electrodes or the crosstalk by the matrix wiring and the influence of the switching noise or the like by the switch elements can be eliminated.

Figure 24:
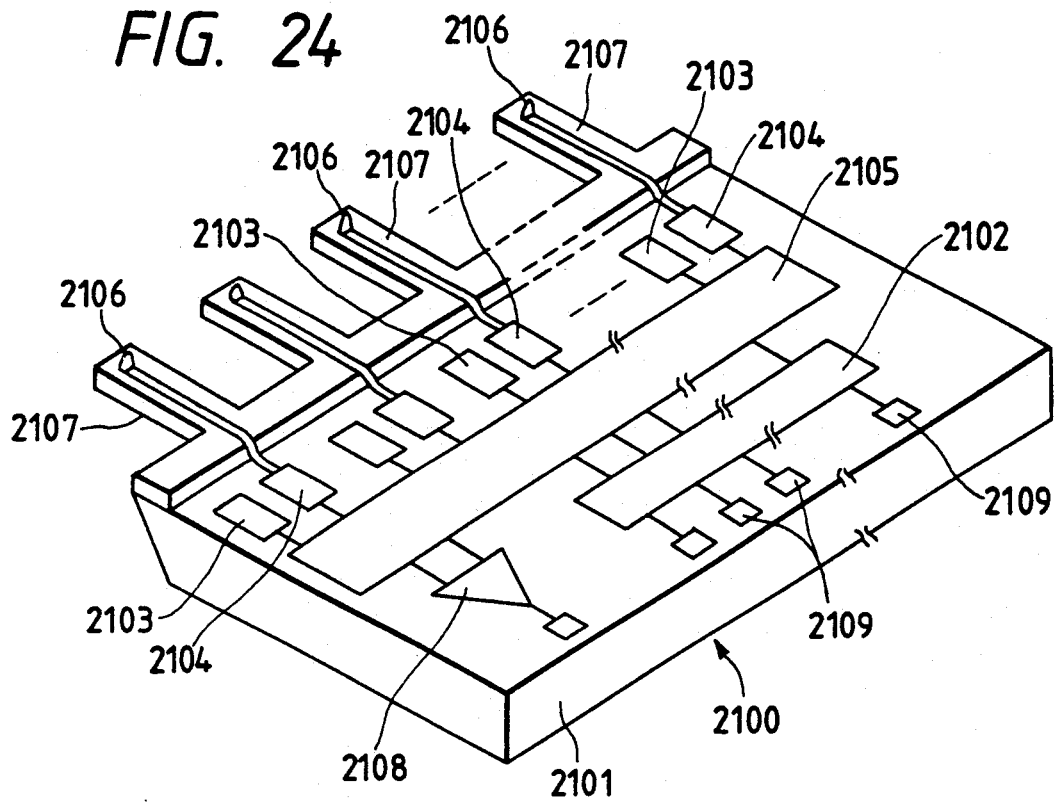
FIG. 24 is a perspective view of the multiprobe head shown in FIG. 22.
Figure 25:
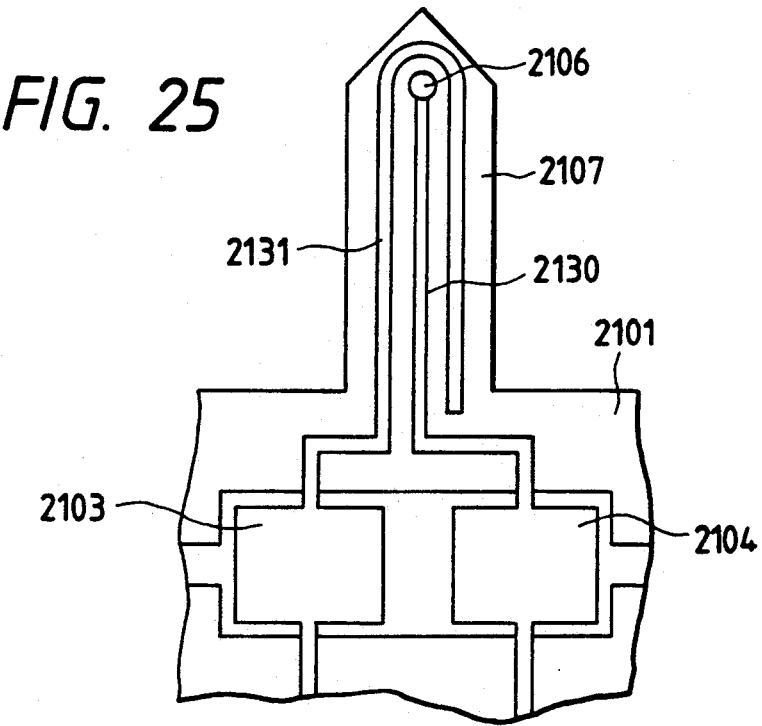
FIG. 25 is an enlarged view of the vicinity of the probe electrode of the multiprobe head shown in FIG. 22.

An example of the circuit construction of this multiprobe head on a substrate will now be described with reference to FIGS. 24 and 25. FIG. 24 is a perspective view of this multiprobe head, and FIG. 25 is an enlarged view of the vicinity of a probe electrode.

As the substrate 2101 of the multiprobe head 2100, use is made, for example, of a silicon substrate. A number of comb-tooth-like piezo-electric cantilevers 2107 are outwardly provided on a side of the substrate 2101, and a probe electrode 2106 is formed on the upper surface of each of the cantilevers 2107. On the substrate 2101, adjacent to each probe electrode 2106, there are provided a charge accumulating electrostatic capacitance 2104 and a dummy electrostatic capacitance 2103 which correspond to that probe electrode 2106. In order to decrease the influence of extraneous noise, as shown in FIG. 25, wiring 2130 from the probe electrode 2106 to the charge accumulating electrostatic capacitance 2104 is surrounded by guard-ring-like wiring 2131 connected to the dummy electrostatic capacitance 2103.

A plurality of bonding pads 2109 for connecting signal lines together are provided in a row on that side of the substrate 2101 which is opposed to the side on which the piezo-electric cantilevers 2107 are formed. Thereby, it becomes possible to move the recording medium (not shown) in a direction parallel to the direction in which the bonding pads 2109 are arranged, and effect recording and reproduction. These bonding pads may also be provided on the two sides of the substrate 2101 which are opposed to each other. The shift resistor 2102 is provided in proximity to the bonding pads 2109, and a control circuit unit 2105 is formed on the central portion of the substrate 2101. In this control circuit unit 2105, there are integrally formed analog switches connected to dummy electrostatic capacitances 2103 and charge accumulating electrostatic capacitances 2104, and circuits for applying bias to the probe electrodes 2106. Further, a differential amplifier 2108 for outputting data is provided on the substrate 2101. These circuits can be manufactured by the utilization of the silicon IC manufacturing process. In such case, by constructing these circuits chiefly of elements of low power consumption including a CMOS circuit, there is very little heat generated by the circuit current and there is no adverse effect on the position control of the probe electrodes.

In this construction, a silicon substrate is used to integrally form driving elements for the reading and writing of data, whereas the present invention is not restricted to the silicon substrate, but use may be made of a substrate comprising thin silicon film epitaxially grown on a sapphire substrate (a so-called SOS substrate), or a semiconductive layer and a substrate in any and all forms such as thin polysilicon film grown on a quartz substrate and solid phase epitaxial film.

What is claimed is:

1. An information processing apparatus for effecting a recording and/or reproduction of information on a recording medium by using a probe electrode, including:
    means for displacing said probe electrode relative to said medium;
    means for applying an electrical current to said displacing means to control said displacing means;
    means for detecting a minute signal obtained from a physical phenomenon occurring between said probe electrode and said medium; and
    means for cutting off the electrical current between said displacing means and said applying means as long as the minute signal is detected by said detecting means.

2. An information processing apparatus according to claim 1, wherein said displacing means is a cantilever type piezo-electric member.

3. An information processing apparatus according to claim 1, wherein said physical phenomenon is a tunnel effect.

4. An information processing apparatus according to claim 1, wherein said cutting off means produces a control signal from said minute signal to cut off said electrical current.

5. An information processing apparatus according to claim 1, wherein said cutting-off means is a switch element integrated on a substrate on which said displacing means is formed.

6. A scanning tunneling microscope for observing therethrough a surface of a sample by using a tunnel current created between a probe electrode and the surface of said sample, including:
    means for displacing said probe electrode relative to the surface of said sample;
    means for applying an electrical current to said displacing means to control said displacing means;
    means for detecting said tunnel current created between said probe electrode and the surface of said sample; and
    means for cutting off the electrical current between said displacing means and said applying means as long as the tunnel current is detected by said detecting means.

7. A scanning tunneling microscope according to claim 6, wherein said displacing means is a cantilever type piezo-electric member.

8. A scanning tunneling microscope according to claim 6, wherein said cutting off means produces a control signal from said tunnel current to cut off said electrical current.

* * * * *

UNITED STATES PATENT AND TRADEMARK OFFICE
CERTIFICATE OF CORRECTION

PATENT NO. : 5,329,122
DATED : July 12, 1994
INVENTOR(S) : KUNIHIRO SAKAI ET AL.

It is certified that error appears in the above-identified patent and that said Letters Patent is hereby corrected as shown below:

COLUMN 3

Line 46, "and 3B" should read --and 3B are--.
Line 52, "and 5B" should read --and 5B are--.

COLUMN 5

Line 35, "provide" should read --provided--.
Line 44, "3B" should read --3B,--.
Line 50, "The also" should read --There also--.

COLUMN 7

Line 53, "to" should be deleted.

COLUMN 8

Line 36, "reading-ouf" should read --reading-out--.
Line 44, "put" should read --placed--.
Line 47, "rendered into" should read --put in--.

COLUMN 9

Line 12, "ren-" should read --turned--.
Line 13, "dered" should be deleted.
Line 61, "SB(j k-1)" should read --SB(j, k-1)--.

UNITED STATES PATENT AND TRADEMARK OFFICE
CERTIFICATE OF CORRECTION

PATENT NO. : 5,329,122
DATED : July 12, 1994
INVENTOR(S) : KUNIHIRO SAKAI ET AL.          Page 2 of 3

It is certified that error appears in the above-identified patent and that said Letters Patent is hereby corrected as shown below:

COLUMN 10

Line 19, "rendered" should read --turned--.
   Line 22, "rendered into" should read --put in--.

COLUMN 11

Line 50, "high is" should read --high in--.

COLUMN 17

Line 7, "capacity" should read --capacitance--.

COLUMN 18

Line 5, "can" should read --can be--.
   Line 20, "after" should read --after being--.

COLUMN 19

Line 67, "capacity" should read --capacitance--.
   Line 68, "capacity" should read --capacitance--.

COLUMN 20

Line 60, "periods" should read --period--.

UNITED STATES PATENT AND TRADEMARK OFFICE
CERTIFICATE OF CORRECTION

PATENT NO.  : 5,329,122
DATED       : July 12, 1994
INVENTOR(S) : KUNIHIRO SAKAI ET AL.

It is certified that error appears in the above-identified patent and that said Letters Patent is hereby corrected as shown below:

COLUMN 22

Line 40, "cutting off" should read --cutting-off--.
    Line 65, "cutting off" should read --cutting-off--.

Signed and Sealed this

Twenty-eight Day of February, 1995

Attest:

BRUCE LEHMAN

Attesting Officer      Commissioner of Patents and Trademarks